US010556637B2

(12) United States Patent
Komatsu et al.

(10) Patent No.: US 10,556,637 B2
(45) Date of Patent: Feb. 11, 2020

(54) BICYCLE OPERATING DEVICE

(71) Applicant: SHIMANO INC., Sakai (JP)

(72) Inventors: Atsushi Komatsu, Sakai (JP);
Takafumi Nishino, Sakai (JP);
Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 263 days.

(21) Appl. No.: 15/247,954

(22) Filed: Aug. 26, 2016

(65) Prior Publication Data

US 2018/0057104 A1 Mar. 1, 2018

(51) Int. Cl.
*B62L 3/02* (2006.01)
*F15B 7/08* (2006.01)
*B62K 23/06* (2006.01)
*B62M 25/08* (2006.01)

(52) U.S. Cl.
CPC ............ *B62L 3/023* (2013.01); *B62K 23/06* (2013.01); *B62M 25/08* (2013.01)

(58) Field of Classification Search
CPC ......... B62L 3/023; B62K 23/06; B62M 25/08
USPC .................................................. 60/585, 594
See application file for complete search history.

(56) References Cited

U.S. PATENT DOCUMENTS

| 2012/0160625 A1 | 6/2012 | Jordan |
| 2013/0014607 A1 | 1/2013 | Miki et al. |
| 2013/0180815 A1* | 7/2013 | Dunlap ................ B62L 3/023 |
| | | 188/344 |
| 2014/0352478 A1 | 12/2014 | Gao |
| 2015/0284049 A1* | 10/2015 | Shipman ............... B62M 25/08 |
| | | 74/473.12 |
| 2016/0152302 A1 | 6/2016 | Nishino |

FOREIGN PATENT DOCUMENTS

| CN | 102874374 | 1/2013 |
| CN | 103204219 | 7/2013 |
| CN | 104210612 | 12/2014 |
| CN | 104973207 | 10/2015 |

* cited by examiner

*Primary Examiner* — Michael Leslie
*Assistant Examiner* — Daniel S Collins
(74) *Attorney, Agent, or Firm* — Mori & Ward, LLP

(57) ABSTRACT

A bicycle operating device comprises a base member, an operating member, a hydraulic unit, an electrical switch, a wireless communicator, and a power supply. The base member includes a first end and a second end opposite to the first end. The operating member is pivotally coupled to the base member about a first pivot axis. At least part of the hydraulic unit is disposed closer to the second end than the first pivot axis when viewed from a first direction parallel to the first pivot axis. The power supply is electrically connected to the wireless communicator to supply electrical power to the wireless communicator. At least one of the wireless communicator and the power supply is at least partly disposed closer to the first end than the first pivot axis when viewed from the first direction.

35 Claims, 25 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The hydraulic unit is coupled to the operating member to operate a bicycle component in response to an operation of the operating member. At least part of the hydraulic unit is disposed closer to the second end than the first pivot axis when viewed from a first direction parallel to the first pivot axis. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. At least one of the wireless communicator and the power supply is at least partly disposed closer to the first end than the first pivot axis when viewed from the first direction.

With the bicycle operating device according to the first aspect, it is possible to provide an optimal arrangement of the hydraulic unit, the wireless communicator, and the power supply.

In accordance with a second aspect of the present invention, the bicycle operating device according to the first aspect further comprises a first pivot shaft pivotally coupling the operating member to the base member about the first pivot axis. The at least part of the hydraulic unit is disposed closer to the second end than the first pivot shaft. The at least one of the wireless communicator and the power supply is at least partly disposed closer to the first end than the first pivot shaft.

With the bicycle operating device according to the second aspect, it is possible to further provide the optimal arrangement of the hydraulic unit, the wireless communicator, and the power supply.

In accordance with a third aspect of the present invention, the bicycle operating device according to the first or second aspect is configured so that the hydraulic unit includes a cylinder bore and a piston movably provided in the cylinder bore. At least one of the cylinder bore and the piston is at least partly disposed closer to the second end than the first pivot axis when viewed from the first direction.

With the bicycle operating device according to the third aspect, it is possible to provide an optimal arrangement of the cylinder bore and the piston.

In accordance with a fourth aspect of the present invention, the bicycle operating device according to the first or second aspect is configured so that the hydraulic unit includes a cylinder bore, a piston movably provided in the cylinder bore, and a hydraulic reservoir connected to the cylinder bore. At least one of the cylinder bore, the piston, and the hydraulic reservoir is at least partly disposed closer to the second end than the first pivot axis when viewed from the first direction.

With the bicycle operating device according to the fourth aspect, it is possible to provide an optimal arrangement of the cylinder bore, the piston, and the hydraulic reservoir.

In accordance with a fifth aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The hydraulic unit is coupled to the operating member to operate a bicycle component in response to an operation of the operating member. At least part of the hydraulic unit is disposed above the first pivot axis when viewed from a first direction parallel to the first pivot axis in a mounting state where the bicycle operating device is mounted to the bicycle handlebar. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. At least one of the wireless communicator and the power supply is at least partly disposed below the first pivot axis when viewed from the first direction in the mounting state of the bicycle operating device.

With the bicycle operating device according to the fifth aspect, it is possible to provide an optimal arrangement of the hydraulic unit, the wireless communicator, and the power supply.

In accordance with a sixth aspect of the present invention, the bicycle operating device according to the fifth aspect further comprises a mounting clamp to be coupled to the bicycle handlebar, the mounting clamp having an annular shape. The annular shape has a clamp center axis. The operating member has a free end farthest from the first pivot axis in the operating member when viewed from the first direction. The at least part of the hydraulic unit is disposed above the first pivot axis when viewed from the first direction in a reference state where the clamp center axis is disposed along a vertical direction and where the free end is disposed below the mounting clamp. The at least one of the wireless communicator and the power supply is at least partly disposed below the first pivot axis when viewed from the first direction in the reference state of the bicycle operating device.

With the bicycle operating device according to the sixth aspect, it is possible to further provide the optimal arrangement of the hydraulic unit, the wireless communicator, and the power supply.

In accordance with a seventh aspect of the present invention, the bicycle operating device according to the fifth or sixth aspect further comprises a first pivot shaft pivotally coupling the operating member to the base member about the first pivot axis. The at least part of the hydraulic unit is disposed above the first pivot shaft when viewed from the first direction in the mounting state of the bicycle operating device. The at least one of the wireless communicator and the power supply is at least partly disposed below the first pivot shaft when viewed from the first direction in the mounting state of the bicycle operating device.

With the bicycle operating device according to the seventh aspect, it is possible to further provide the optimal arrangement of the hydraulic unit, the wireless communicator, and the power supply.

In accordance with an eighth aspect of the present invention, the bicycle operating device according to any one of the fifth to seventh aspects is configured so that the hydraulic unit includes a cylinder bore and a piston movably provided in the cylinder bore. At least one of the cylinder bore and the piston is at least partly disposed above the first pivot axis when viewed from the first direction in the mounting state of the bicycle operating device.

With the bicycle operating device according to the eighth aspect, it is possible to provide an optimal arrangement of the cylinder bore and the piston.

In accordance with a ninth aspect of the present invention, the bicycle operating device according to any one of the fifth to seventh aspects is configured so that the hydraulic unit includes a cylinder bore, a piston movably provided in the cylinder bore, and a hydraulic reservoir connected to the cylinder bore. At least one of the cylinder bore, the piston, and the hydraulic reservoir is at least partly disposed above the first pivot axis when viewed from the first direction in the mounting state of the bicycle operating device.

With the bicycle operating device according to the ninth aspect, it is possible to provide an optimal arrangement of the cylinder bore, the piston, and the hydraulic reservoir.

In accordance with a tenth aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The operating member has a free end farthest from the first pivot axis in the operating member when viewed from a first direction parallel to the first pivot axis. The hydraulic unit is coupled to the operating member to operate a bicycle component in response to an operation of the operating member. At least part of the hydraulic unit is disposed farther from the free end than the first pivot axis when viewed from the first direction. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. At least one of the wireless communicator and the power supply is at least partly disposed closer to the free end than the first pivot axis when viewed from the first direction.

With the bicycle operating device according to the tenth aspect, it is possible to provide an optimal arrangement of the hydraulic unit, the wireless communicator, and the power supply.

In accordance with an eleventh aspect of the present invention, the bicycle operating device according to the tenth aspect further comprises a first pivot shaft pivotally coupling the operating member to the base member about the first pivot axis. The at least part of the hydraulic unit is disposed farther from the free end than the first pivot shaft when viewed from the first direction. The at least one of the wireless communicator and the power supply is at least partly disposed closer to the free end than the first pivot shaft when viewed from the first direction.

With the bicycle operating device according to the eleventh aspect, it is possible to further provide the optimal arrangement of the hydraulic unit, the wireless communicator, and the power supply.

In accordance with a twelfth aspect of the present invention, the bicycle operating device according to the tenth or eleventh aspect is configured so that the hydraulic unit includes a cylinder bore and a piston movably provided in the cylinder bore. At least one of the cylinder bore and the piston is at least partly disposed farther from the free end than the first pivot axis when viewed from the first direction.

With the bicycle operating device according to the twelfth aspect, it is possible to provide an optimal arrangement of the cylinder bore and the piston.

In accordance with a thirteenth aspect of the present invention, the bicycle operating device according to the tenth or eleventh aspect is configured so that the hydraulic unit includes a cylinder bore, a piston movably provided in the cylinder bore, and a hydraulic reservoir connected to the cylinder bore. At least one of the cylinder bore, the piston, and the hydraulic reservoir is at least partly disposed farther from the free end than the first pivot axis when viewed from the first direction.

With the bicycle operating device according to the thirteenth aspect, it is possible to provide an optimal arrangement of the cylinder bore, the piston, and the hydraulic reservoir.

In accordance with a fourteenth aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The hydraulic unit is coupled to the operating member to operate a bicycle component in response to an operation of the operating member. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. The hydraulic unit is at least partly disposed closer to the second end than at least one of the wireless communicator and the power supply when viewed from a first direction parallel to the first pivot axis.

With the bicycle operating device according to the fourteenth aspect, it is possible to provide an optimal arrangement of the hydraulic unit, the wireless communicator, and the power supply.

In accordance with a fifteenth aspect of the present invention, the bicycle operating device according to the fourteenth aspect is configured so that the hydraulic unit includes a cylinder bore and a piston movably provided in the cylinder bore. At least one of the cylinder bore and the piston is at least partly disposed closer to the second end than the at least one of the wireless communicator and the power supply when viewed from the first direction.

With the bicycle operating device according to the fifteenth aspect, it is possible to provide an optimal arrangement of the cylinder bore and the piston.

In accordance with a sixteenth aspect of the present invention, the bicycle operating device according to the fourteenth aspect is configured so that the hydraulic unit includes a cylinder bore, a piston movably provided in the cylinder bore, and a hydraulic reservoir connected to the cylinder bore. At least one of the cylinder bore, the piston, and the hydraulic reservoir is at least partly disposed closer to the second end than the at least one of the wireless communicator and the power supply when viewed from the first direction.

With the bicycle operating device according to the sixteenth aspect, it is possible to provide an optimal arrangement of the cylinder bore, the piston, and the hydraulic reservoir.

In accordance with a seventeenth aspect of the present invention, the bicycle operating device according to any one of the first to sixteenth aspects is configured so that the hydraulic unit is at least partly disposed in the base member.

With the bicycle operating device according to the seventeenth aspect, it is possible to utilize the base member as an area in which the hydraulic unit is at least partly disposed. This can make the bicycle operating device compact.

In accordance with an eighteenth aspect of the present invention, the bicycle operating device according to any one of the first to seventeenth aspects is configured so that the hydraulic unit includes a cylinder bore and a piston movably provided in the cylinder bore. The base member includes a hose passageway in which a hydraulic hose connected to the hydraulic unit is provided.

With the bicycle operating device according to the eighteenth aspect, it is possible to guide the hydraulic hose along the hose passageway. This allows the hydraulic hose to be easily attached to and/or detached from the base member, improving the maintenance of the bicycle operating device.

In accordance with a nineteenth aspect of the present invention, the bicycle operating device according to the eighteenth aspect is configured so that the base member includes a base body and a hose cover attached to the base member to at least partly provide the hose passageway between the base body and the hose cover. The hose cover is a separate member from the base member. The base body includes an accommodation space in which the at least one of the wireless communicator and the power supply is at least partly provided. The accommodation space includes an outer opening. The hose cover is attached to the base body to at least partly cover the outer opening of the accommodation space.

With the bicycle operating device according to the nineteenth aspect, it is possible to hold and/or protect the hydraulic hose with the hose cover with improving the maintenance of the bicycle operating device.

In accordance with a twentieth aspect of the present invention, the bicycle operating device according to the nineteenth aspect is configured so that the hose cover is integrally provided as a one-piece unitary member.

With the bicycle operating device according to the twentieth aspect, it is possible to simplify the structure of the bicycle operating device with holding and/or protecting the hydraulic hose with the hose cover.

In accordance with a twenty-first aspect of the present invention, the bicycle operating device according to any one of the eighteenth to twentieth aspects is configured so that the at least one of the wireless communicator and the power supply is at least partly disposed below the hose passageway when viewed from the first direction in a mounting state where the bicycle operating device is mounted to the bicycle handlebar.

With the bicycle operating device according to the twenty-first aspect, it is possible to utilize an area provided below the hose passageway as an area for the at least one of the wireless communicator and the power supply.

In accordance with a twenty-second aspect of the present invention, the bicycle operating device according to any one of the first to twenty-first aspects is configured so that at least one of the wireless communicator and the power supply is at least partly disposed at the base member.

With the bicycle operating device according to the twenty-second aspect, it is possible to the base member as an area in which the at least one of the wireless communicator and the power supply is at least partly disposed. This can make the bicycle operating device compact.

In accordance with a twenty-third aspect of the present invention, the bicycle operating device according to any one of the first to twenty-second aspects is configured so that the bicycle operating device is configured to be mounted on a bicycle having a transverse center plane. The base member includes a first lateral surface and a second lateral surface. The wireless communicator is disposed between the first lateral surface and the second lateral surface in the first direction. The first lateral surface is closer to the wireless communicator than the second lateral surface in the first direction.

With the bicycle operating device according to the twenty-third aspect, it is possible to utilize an area provided between the first lateral surface and the second lateral surface in the first direction as an area for the wireless communicator. This can make the bicycle operating device compact.

In accordance with a twenty-fourth aspect of the present invention, the bicycle operating device according to the twenty-third aspect is configured so that the first lateral surface is disposed closer to the transverse center plane than the second lateral surface.

With the bicycle operating device according to the twenty-fourth aspect, a rider's hand is less likely to cover the first lateral surface in a state where the base member is gripped by the rider's hand. This can easily keep high strength of radio waves transmitted from the wireless communicator even if the wireless communicator is disposed at the base member.

In accordance with a twenty-fifth aspect of the present invention, the bicycle operating device according to any one of the first to twenty-fourth aspects is configured so that at least one of the wireless communicator and the power supply is at least partly disposed at the operating member.

With the bicycle operating device according to the twenty-fifth aspect, it is possible to utilize the operating member as an area in which the at least one of the wireless communicator and the power supply is at least partly disposed. This can make the bicycle operating device compact.

In accordance with a twenty-sixth aspect of the present invention, the bicycle operating device according to any one of the first to twenty-fifth aspects further comprises an additional operating member movably coupled to the operating member. At least one of the wireless communicator and the power supply is at least partly disposed at the additional operating member.

With the bicycle operating device according to the twenty-sixth aspect, it is possible to utilize the additional operating member as an area in which the at least one of the wireless communicator and the power supply is at least partly disposed. This can make the bicycle operating device compact.

In accordance with a twenty-seventh aspect of the present invention, the bicycle operating device according to the twenty-sixth aspect is configured so that the wireless communicator is at least partly disposed at the additional operating member. The power supply is at least partly disposed at the base member and is at least partly closer to the first end than the first pivot axis when viewed from the first direction.

With the bicycle operating device according to the twenty-seventh aspect, it is possible to utilize an area closer to the first end in the base member as an area in which the power supply is at least partly disposed. This can make the operating device compact.

In accordance with a twenty-eighth aspect of the present invention, the bicycle operating device according to the twenty-seventh aspect further comprises a cable electrically connecting between the wireless communicator and the power supply.

With the bicycle operating device according to the twenty-eighth aspect, it is possible to arrange the wireless communicator and the power supply at positions separated from each other.

In accordance with a twenty-ninth aspect of the present invention, the bicycle operating device according to any one of the first to twenty-eighth aspects is configured so that the power supply includes a battery and a battery holder. The battery is detachably mounted to the battery holder.

With the bicycle operating device according to the twenty-ninth aspect, it is possible to supply the electrical power from the battery to the wireless communicator. Accordingly, it is possible to omit a power cable.

In accordance with a thirtieth aspect of the present invention, the bicycle operating device according to any one of the first to twenty-ninth aspects is configured so that the base member includes a mounting surface disposed at the first end. The mounting surface includes a curved shape corresponding to a drop-down handlebar.

With the bicycle operating device according to the thirtieth aspect, it is possible to firmly fix the bicycle operating device to the drop-down handlebar.

In accordance with a thirty-first aspect of the present invention, the bicycle operating device according to any one of the first to thirtieth aspects is configured so that the base member includes a grip portion arranged between the first end and the second end.

With the bicycle operating device according to the thirty-second aspect, the grip portion allows the user to easily operate the operating member.

In accordance with a thirty-second aspect of the present invention, the bicycle operating device according to any one of the first to thirty-first aspects is configured so that the base member includes a pommel portion disposed at the second end.

With the bicycle operating device according to the thirty-second aspect, the pommel portion allows the user to lean on the base member during riding a bicycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
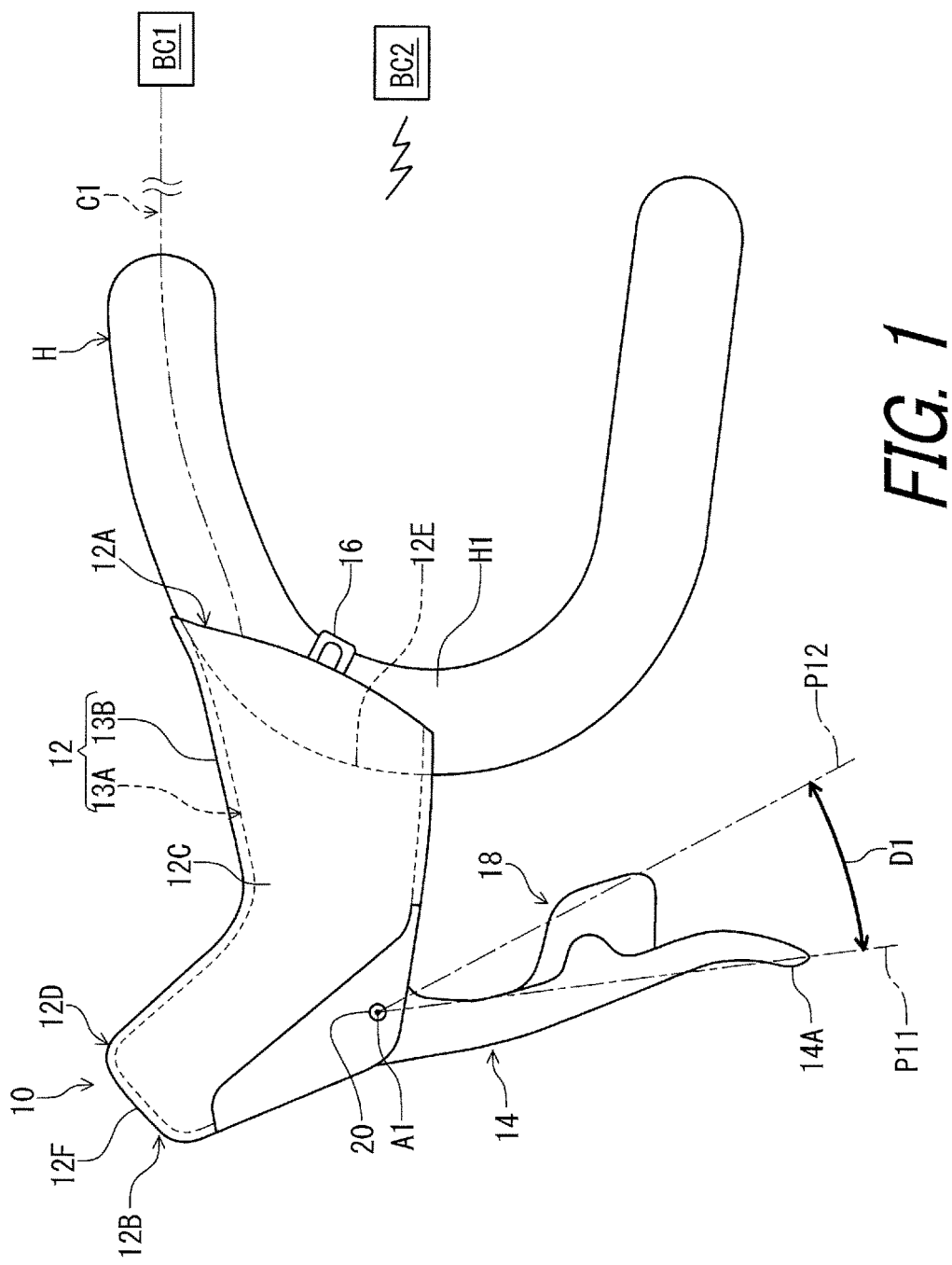
FIG. 1 is a side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H. In this embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar. The handlebar H can also be referred to as the drop-down handlebar H.

The bicycle operating device 10 is operatively coupled to a bicycle component BC1 such as a hydraulic brake. In this embodiment, the bicycle operating device 10 is operatively coupled to the bicycle component BC1 via a hydraulic hose C1. The bicycle component BC1 can also be referred to as a hydraulic brake BC1.

Furthermore, the bicycle operating device 10 is operatively connected to an additional component BC2 via wireless communication. Examples of the additional component BC2 include an electric shifting device (e.g., a derailleur or an internal-gear hub), an electric suspension, an electric seatpost and a digital device (e.g., a cycle computer, a cell phone or a music player). In this embodiment, the bicycle operating device 10 is operatively connected to an electric shifting device provided as the additional component BC2 via wireless communication. The additional component BC2 can also be referred to as an electrical bicycle component BC2.

In this embodiment, the bicycle operating device 10 is a right hand side control device configured to be operated by the rider's right hand to actuate the bicycle component BC1 and the additional component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

The bicycle operating device 10 comprises a base member 12 and an operating member 14. The base member 12 includes a first end 12A to be mounted to a bicycle handlebar H (e.g., a curved part H1) and a second end 12B opposite to the first end 12A. The base member 12 extends between the first end 12A and the second end 12B. The bicycle operating device 10 further comprises a mounting clamp 16 to be coupled to the bicycle handlebar H. The mounting clamp 16 is attached to the first end 12A of the base member 12 to couple the first end 12A to the bicycle handlebar H.

Figure 2:
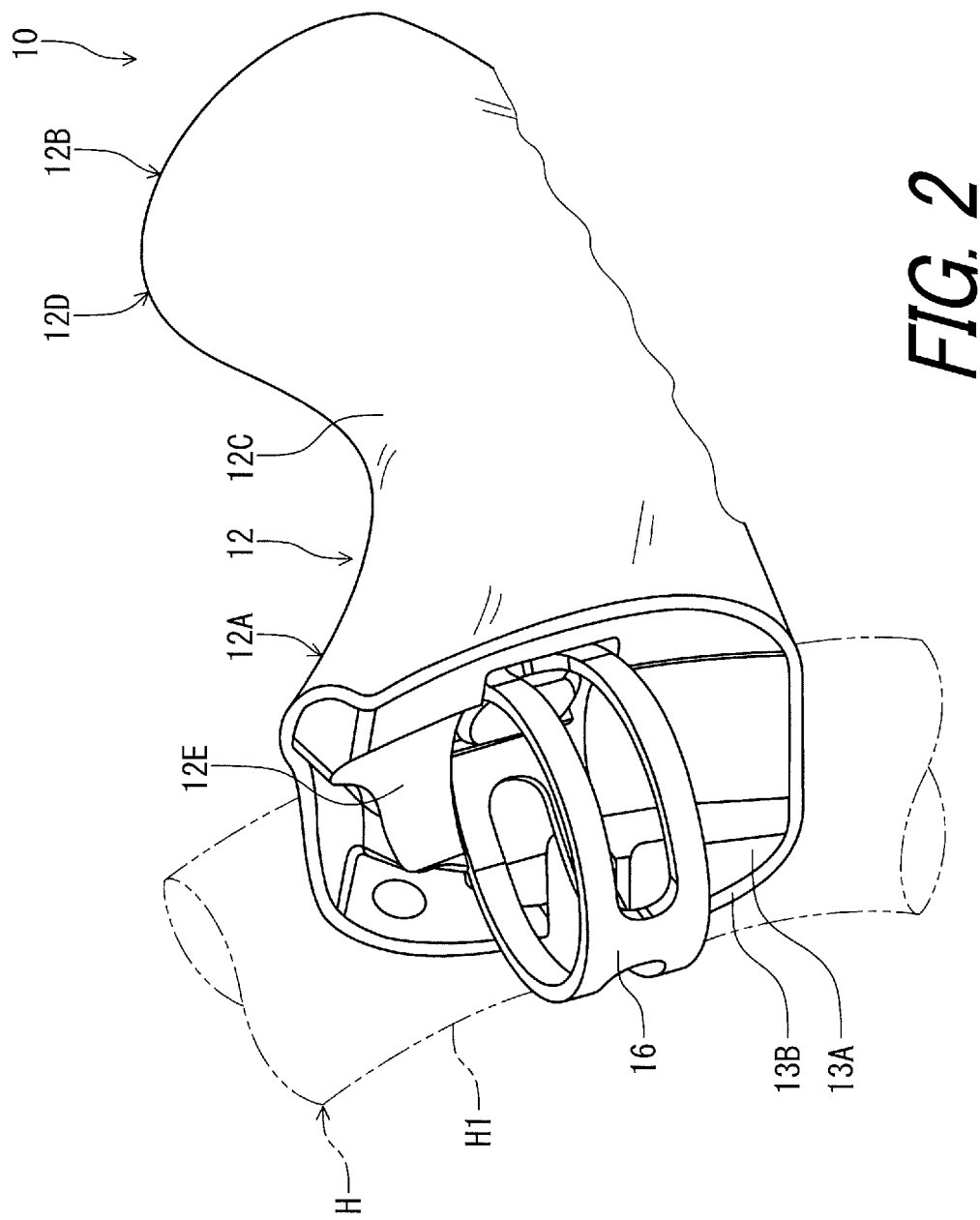
FIG. 2 is a partial perspective view of the bicycle operating device illustrated in FIG. 1.

As seen in FIG. 2, the mounting clamp 16 has an annular shape. The annular shape has a clamp center axis CA. The base member 12 includes a mounting surface 12E disposed at the first end 12A. The mounting surface 12E includes a curved shape corresponding to the drop-down handlebar H. Specifically, the mounting surface 12E has the curved shape corresponding to an outer peripheral surface of the curved part H1.

As seen in FIG. 1, the base member 12 includes an end surface 12F provided at the second end 12B. The end surface 12F is farthest from the mounting surface 12E in the base member 12. The base member 12 includes a grip portion 12C arranged between the first end 12A and the second end 12B. The base member 12 includes a pommel portion 12D disposed at the second end 12B. The pommel portion 12D extends obliquely upward from the grip portion 12C. For example, the pommel portion 12D is disposed at a position higher than a position of the first end 12A in a mounting state where the bicycle operating device 10 is mounted to the bicycle handlebar H. The pommel portion 12D can also be configured to be graspable if needed and/or desired. The grip portion 12C and the pommel portion 12D can be omitted from the base member 12.

In this embodiment, the base member 12 includes a base body 13A and a grip cover 13B. The grip cover 13B at least partly covers the base body 13A. The first end 12A, the second end 12B, the grip portion 12C, and the pommel portion 12D are constituted by at least one of the base body 13A and the grip cover 13B. The base body 13A is made of a metallic material (e.g., aluminum) or a non-metallic material (e.g., a resin material). The grip cover 13B is made of a material different from the material of the base body 13A. For example, the grip cover 13B is made of an elastic material such as rubber. The grip cover 13B can be omitted from the base member 12.

As seen in FIG. 1, the operating member 14 is pivotally coupled to the base member 12 about a first pivot axis A1. The operating member 14 is pivotable relative to the base member 12 between a first rest position P11 and a first operated position P12 in a first operating direction D1. The operating member 14 is provided as a brake operating lever pivotable about the first pivot axis A1. The first operating direction D1 is a circumferential direction defined about the first pivot axis A1. The operating member 14 has a free end 14A farthest from the first pivot axis A1 in the operating member 14 when viewed from a first direction D2 (FIG. 3) parallel to the first pivot axis A1.

Figure 3:
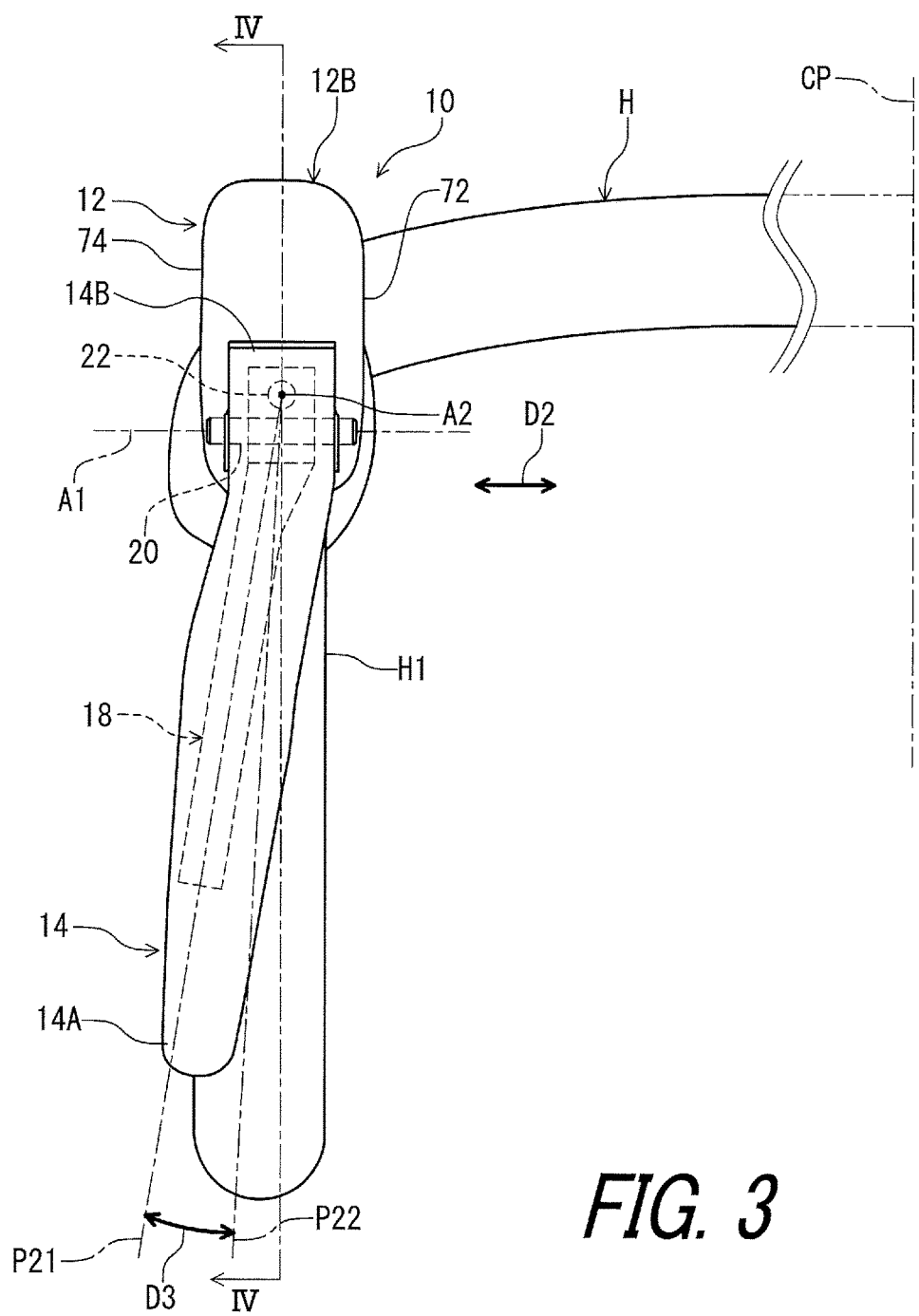
FIG. 3 is a front view of the bicycle operating device illustrated in FIG. 1.

As seen in FIG. 3, the bicycle operating device 10 further comprises an additional operating member 18 movably coupled to the operating member 14. In this embodiment, the additional operating member 18 is pivotally coupled to the operating member 14 about a second pivot axis A2. In other words, the additional operating member 18 is movably mounted relative to the base member 12. The additional operating member 18 is pivotable relative to the operating member 14 between a second rest position P21 and a second operated position P22 in a second operating direction D3 different from the first operating direction D1. In this embodiment, the second operating direction D3 is a circumferential direction defined about the second pivot axis A2. The additional operating member 18 can be directly movably coupled to the base member 12.

In the present application, the term "rest position" as used herein refers to a position at which a movable part such as the operating member 14 and the additional operating member 18 remains stationary in a state where the movable part is not operated by the user. The term "operated position" as used herein refers to a position at which the movable part has been operated by the user to perform the operation of the bicycle component.

Figure 4:
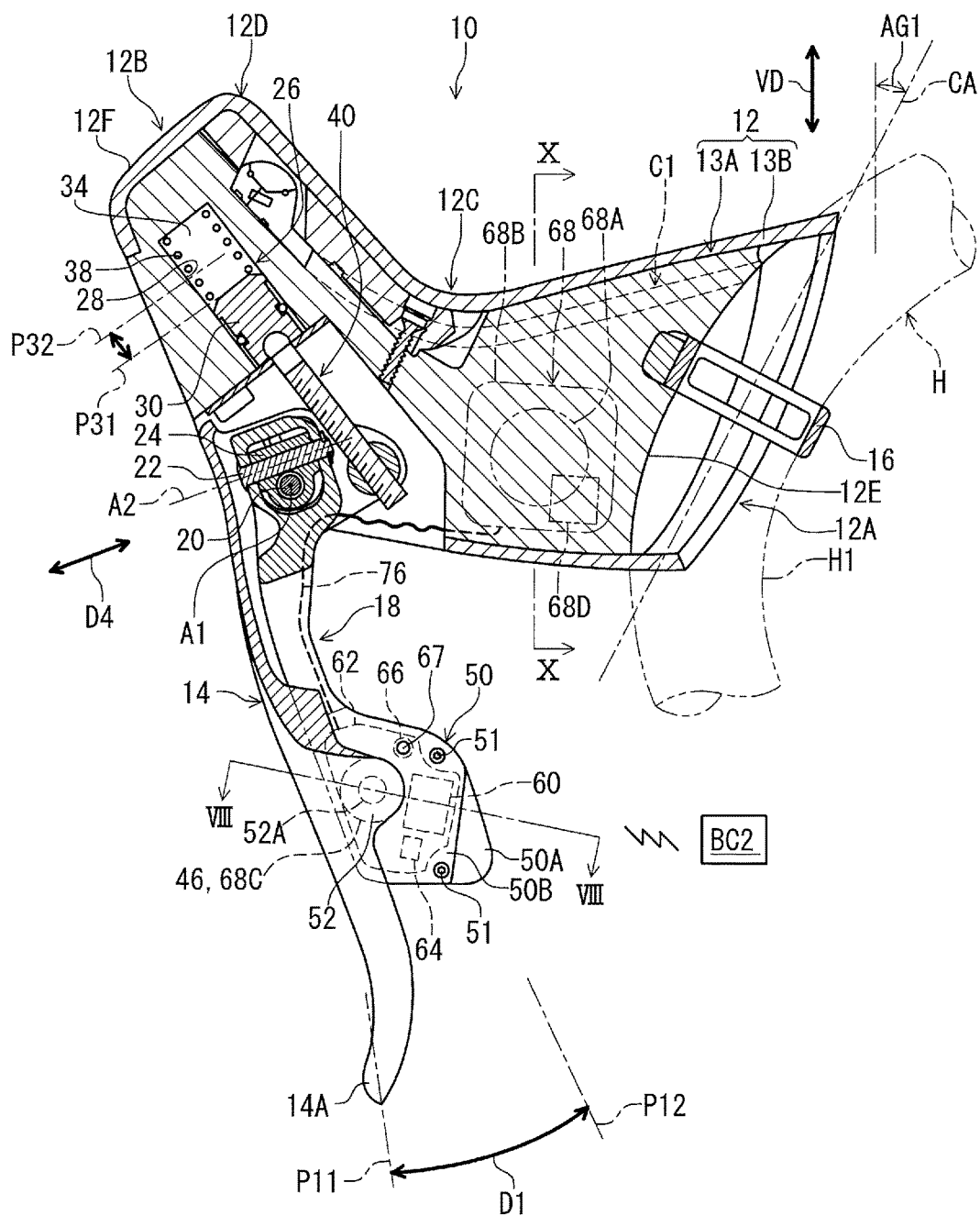
FIG. 4 is a cross-sectional view of the bicycle operating device taken along line IV-IV of FIG. 3.

As seen in FIG. 4, the bicycle operating device 10 further comprises a first pivot shaft 20 pivotally coupling the operating member 14 to the base member 12 about the first pivot axis A1. The first pivot shaft 20 defines the first pivot axis A1. The operating member 14 is biased by a first biasing member (not shown) toward the first rest position P11 relative to the base member 12. Thus, the operating member 14 is at the first rest position P11 in a state where the operating member 14 is not operated by the user.

The bicycle operating device 10 further comprises a second pivot shaft 22 pivotally coupling the additional operating member 18 to the operating member 14 about the second pivot axis A2. The second pivot shaft 22 defines the second pivot axis A2. In this embodiment, the bicycle operating device 10 further comprises an intermediate member 24 pivotally coupled to the base member 12 about the first pivot axis A1 via the first pivot shaft 20 together with the operating member 14. The intermediate member 24 is secured to the operating member 14. The additional operating member 18 is pivotally coupled to the intermediate member 24 about the second pivot axis A2 via the second pivot shaft 22. The intermediate member 24 restricts a relative movement between the operating member 14 and the additional operating member 18 in the first operating direction D1. Thus, the additional operating member 18 is pivotable together with the operating member 14 relative to the base member 12 about the first pivot axis A1 in the first operating direction D1.

The second pivot axis A2 is disposed above the first pivot axis A1 in the mounting state of the bicycle operating device 10. The second pivot shaft 22 is disposed above the first pivot shaft 20 in the mounting state of the bicycle operating device 10. However, the positional relationship between the first pivot axis A1 and the second pivot axis A2 is not limited to this embodiment. The positional relationship between the first pivot shaft 20 and the second pivot shaft 22 is not limited to this embodiment.

Figure 5:
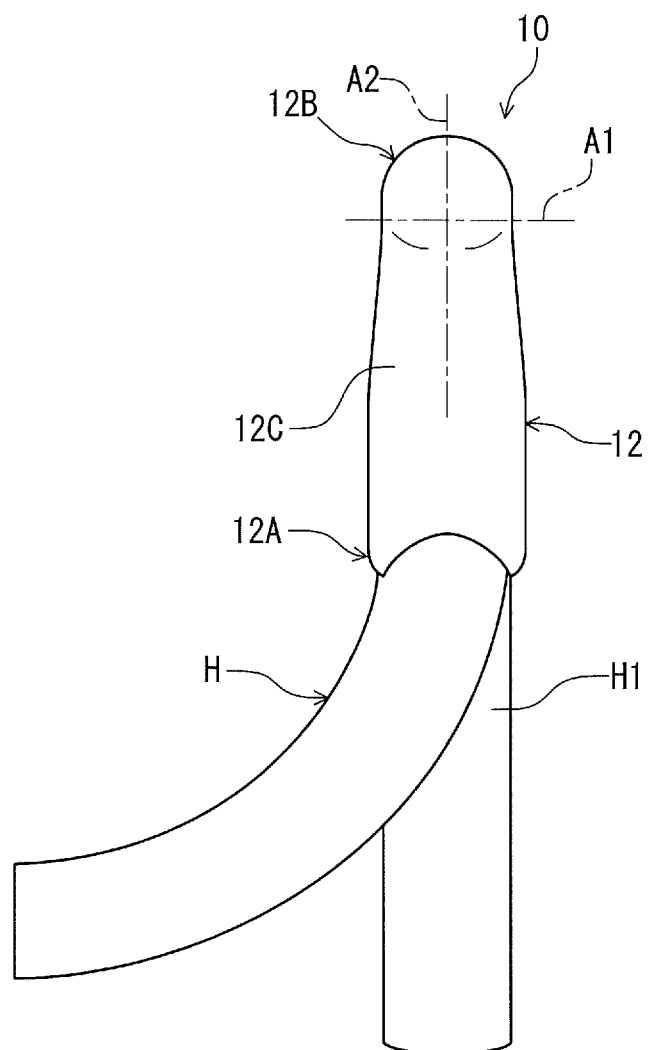
FIG. 5 is a top view of the bicycle operating device illustrated in FIG. 1.

As seen in FIG. 5, the second pivot axis A2 is non-parallel to the first pivot axis A1. Specifically, the second pivot axis A2 is perpendicular to the first pivot axis A1 when viewed from above the bicycle operating device 10 in the mounting state where the bicycle operating device 10 is mounted to the handlebar H. However, the second pivot axis A2 can be inclined relative to the first pivot axis A1 when viewed from above the bicycle operating device 10 in the mounting state where the bicycle operating device 10 is mounted to the handlebar H.

While the additional operating member 18 is used as a shift operating member in this embodiment, the additional operating member 18 can be used as an operating member other than the shift operating member. For example, the additional operating member 18 can be used as a suspension operating member in a case where the electrical bicycle component includes the electric suspension. The additional operating member 18 can be used as a seatpost operating member in a case where the electrical bicycle component includes the electric seatpost.

As seen in FIG. 3, the operating member 14 has a curved shape when viewed from a second direction D4 (FIG. 4) parallel to the second pivot axis A2. The free end 14A is offset from a proximal end 14B of the operating member 14 in the first direction D2. However, the operating member 14 can have a straight shape extending from the proximal end 14B to the free end 14A when viewed from the second direction D4. In such an embodiment, the second rest position P21 of the additional operating member 18 is adjusted toward a transverse center plane CP of a bicycle. The transverse center plane CP is defined as a center plane of the bicycle handlebar H or a bicycle frame of the bicycle in a transverse direction of the bicycle in the upright riding position.

Figure 6:
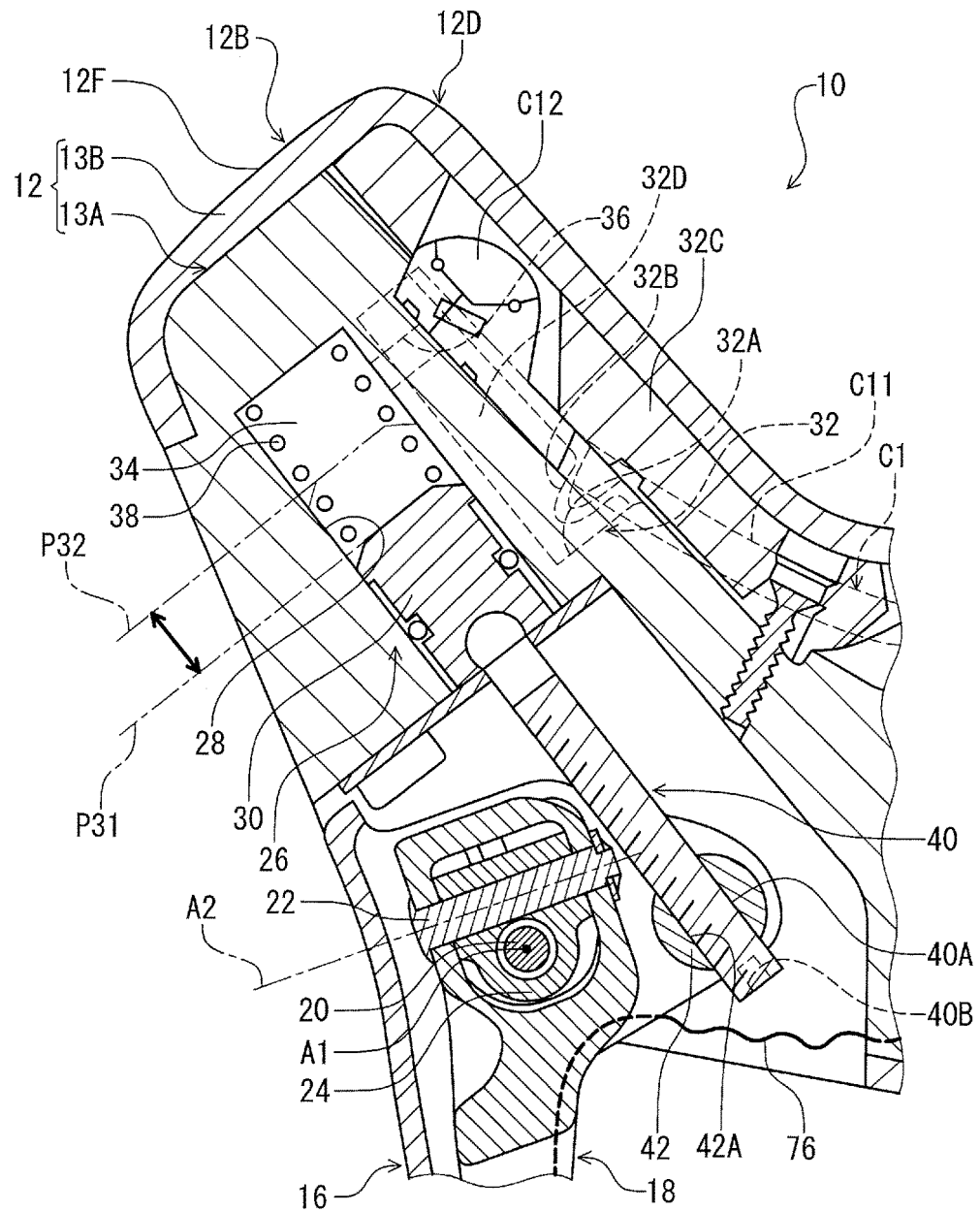
FIG. 6 is a partial cross-sectional view of the bicycle operating device illustrated in FIG. 1.

As seen in FIG. 6, the bicycle operating device 10 comprises a hydraulic unit 26 coupled to the operating member 14 to operate the bicycle component BC1 in response to an operation of the operating member 14. The hydraulic unit 26 is coupled to the operating member 14 to generate a hydraulic pressure in response to a pivotal movement of the operating member 14 relative to the base member 12.

The hydraulic unit 26 includes a cylinder bore 28, a piston 30, and a hydraulic reservoir 32. The piston 30 is movably provided in the cylinder bore 28. The hydraulic reservoir 32 is connected to the cylinder bore 28. The piston 30 is movable relative to the cylinder bore 28 between an initial position P31 and an actuated position P32. The cylinder bore 28 and the piston 30 define a hydraulic chamber 34. The hydraulic reservoir 32 is connected to the hydraulic chamber 34. The hydraulic chamber 34 is connected to the bicycle component BC1 via the hydraulic hose C1. The base member 12 includes a fluid passageway 36. The hydraulic chamber 34 is connected to the hydraulic hose C1 via the fluid passageway 36. For example, the hydraulic reservoir 32 includes a recess 32A, a diaphragm 32B, and a lid 32C. The recess 32A is provided in the base member 12. The diaphragm 32B is provided in the recess 32A. The lid 32C is attached to the base member 12 to cover the recess 32A. A reservoir chamber 32D is defined by the recess 32A and the diaphragm 32B. The reservoir chamber 32D is connected to the hydraulic chamber 34 via at least one connection hole (not shown).

The hydraulic unit 26 includes a return spring 38 and a piston rod 40. The return spring 38 is provided in the hydraulic chamber 34 to bias the piston 30 toward the initial position P31. The piston rod 40 is operatively coupled to the piston 30. The bicycle operating device 10 includes a coupling pin 42 rotatably attached to the operating member 14. The piston rod 40 includes an externally threaded portion 40A. The coupling pin 42 includes a threaded hole 42A threadedly engaged with the externally threaded portion 40A. The piston rod 40 includes a tool engagement part 40B disposed at one end of the piston rod 40 to be engaged with a tool such as a hexagonal wrench. The piston rod 40 is rotated relative to the coupling pin 42 by the user using the tool. Rotation of the piston rod 40 changes the first rest position P11 of the operating member 14.

The hydraulic unit 26 is at least partly disposed in the base member 12. In this embodiment, the hydraulic unit 26 is entirely disposed in an outline of the base member 12 when viewed from the first direction D2. However, the hydraulic unit 26 can be partly disposed in the base member 12. For example, at least one of the piston 30 and the hydraulic reservoir 32 can be partly disposed at another member (e.g., the operating member 14 or the additional operating member 18) which is a separate member from the base member 12. Furthermore, the cylinder bore 28 is provided in the base member 12. However, the cylinder bore 28 can be provided in another member (e.g., the operating member 14 or the additional operating member 18) which is a separate member from the base member 12.

Figure 7:
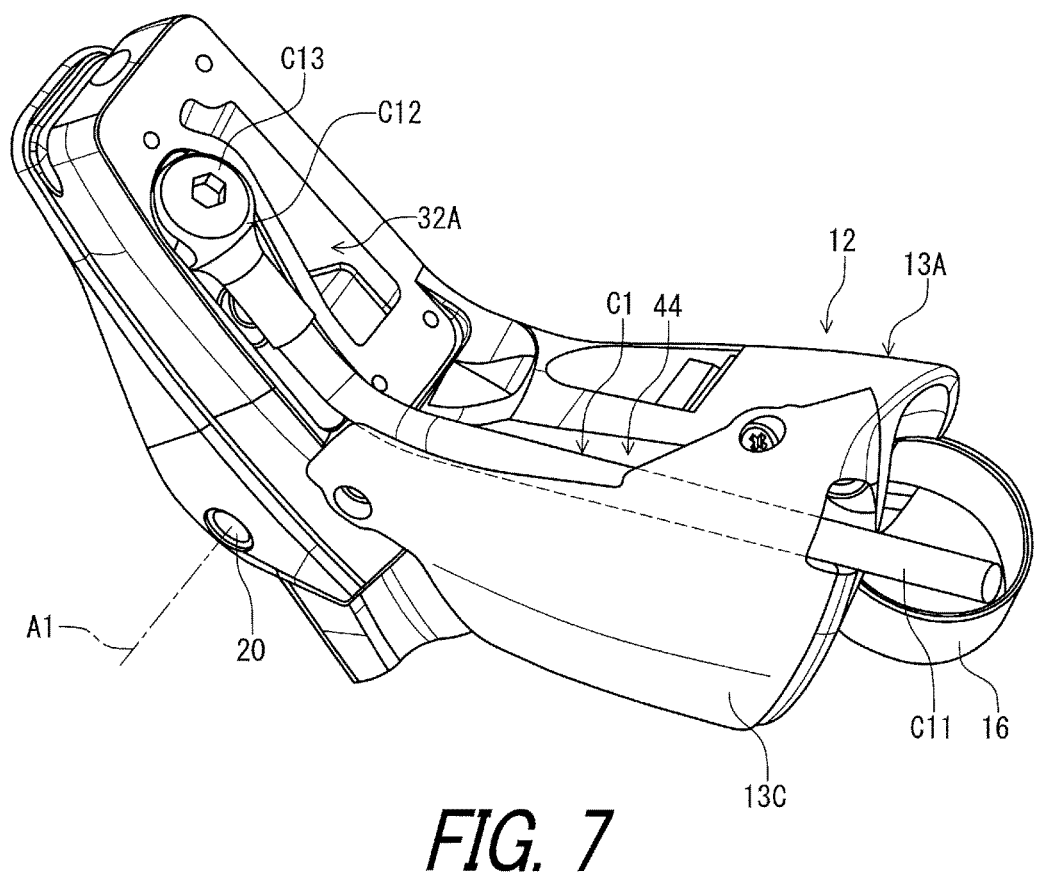
FIG. 7 is a partial perspective view of the bicycle operating device illustrated in FIG. 1, with a grip cover omitted.

As seen in FIG. 7, the base member 12 includes a hose passageway 44 in which the hydraulic hose C1 connected to the hydraulic unit 26 is provided. For example, the hose passageway 44 can include at least one of a groove and a recess. The base member 12 includes a hose cover 13C attached to the base body 13A to at least partly provide the hose passageway 44 between the base body 13A and the hose cover 13C. The hose cover 13C is detachably secured to the base body 13A via fasteners such as screws. The hose cover 13C is a separate member from the base member 12. The hose cover 13C is integrally provided as a one-piece unitary member. However, the hose cover 13C can include a plurality of separate members.

The term "detachably secured" or "detachably securing", as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably attached", "detachably joined", "detachably connected", "detachably coupled", "detachably mounted", "detachably bonded", "detachably fixed" and their derivatives.

The hydraulic hose C1 includes a hose body C11 and a banjo C12 provided at an end of the hose body C11. The banjo C12 is coupled to the base body 13A with a banjo bolt C13. The hose body C11 is connected to the hydraulic chamber 34 (FIG. 6) of the hydraulic unit 26 via the fluid passageway 36 (FIG. 6), the banjo bolt C13, and the banjo C12.

As seen in FIG. 4, the bicycle operating device 10 comprises an electrical switch 46 to be activated by an input operation from a user. The electrical switch 46 is disposed at one of the base member 12, the operating member 14, and the additional operating member 18. In this embodiment, the electrical switch 46 is disposed at the additional operating member 18 to be activated by the input operation from the user. The electrical switch 46 is attached to the additional operating member 18 to be activated in response to a pivotal movement of the additional operating member 18 relative to the operating member 14. However, the electrical switch 46 can be disposed at one of the base member 12 and the operating member 14. In such an embodiment, the additional operating member 18 can be omitted from the bicycle operating device 10. While the electrical switch 46 is a normally open switch in this embodiment, other type of switches can be applied to the bicycle operating device 10.

While the electrical switch 46 are used as a shift control switch in this embodiment, the electrical switch 46 can be used as a switch other than the shift control switch. For example, the additional operating member 18 can be used as a suspension control switch in a case where the additional component BC2 includes the electric suspension. The additional operating member 18 can be used as a seatpost control member in a case where the additional component BC2 includes the electric seatpost.

Figure 8:
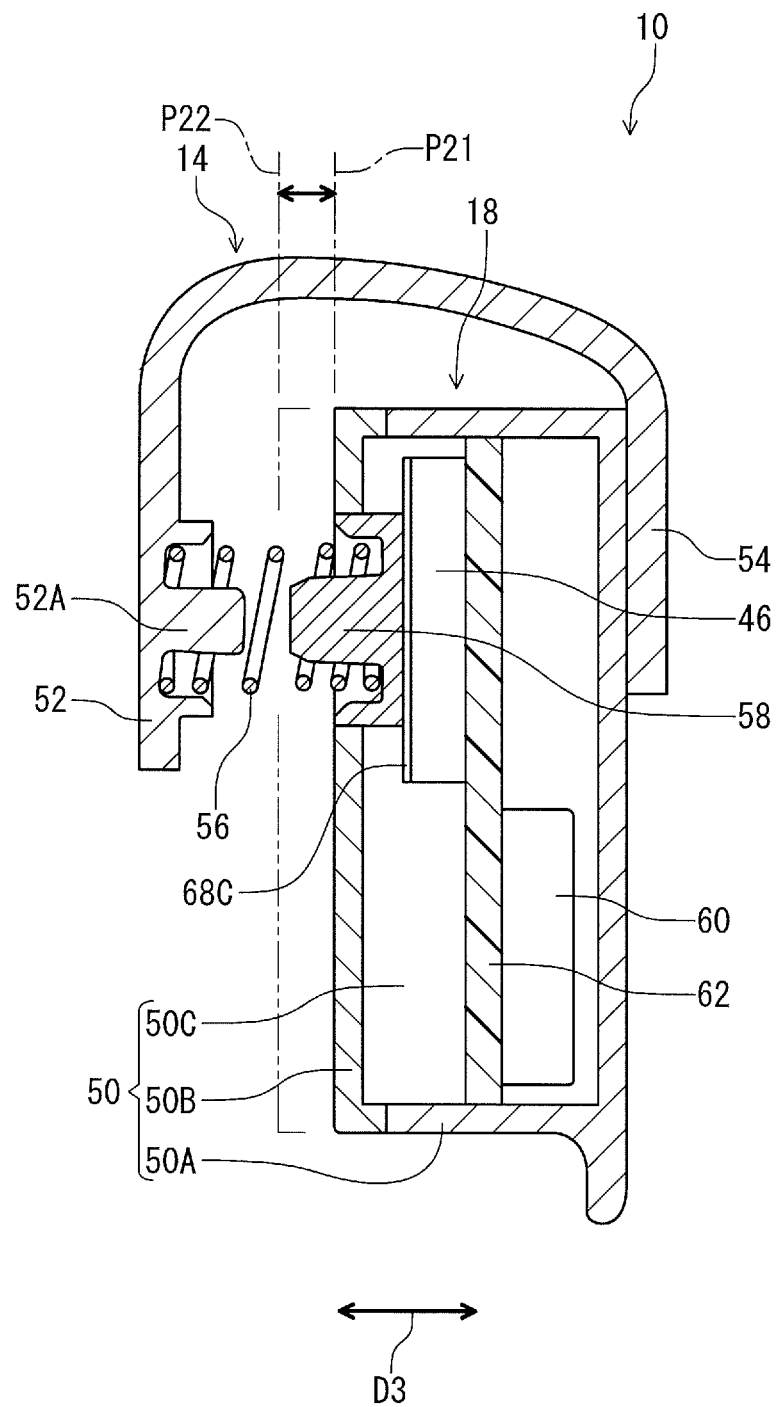
FIG. 8 is a cross-sectional view of the bicycle operating device taken along line VIII-VIII of FIG. 4.

As seen in FIGS. 4 and 8, the additional operating member 18 includes an attachment part 50. The electrical switch 46 is attached to the attachment part 50. The attachment part 50 includes an attachment base 50A and a cover 50B. The cover 50B is detachably attached to the attachment base 50A with fasteners 51 such as screws. An internal space 50C is defined by the attachment base 50A and the cover 50B. The internal space 50C is sealed by seal members (not shown) in a state where the cover 50B is attached to the attachment base 50A. The electrical switch 46 is disposed in the internal space 50C of the attachment part 50.

As seen in FIG. 8, the operating member 14 includes an actuation part 52 disposed to face the electrical switch 46 to press the electrical switch 46 in response to the movement of the additional operating member 18 in the second operating direction D3 relative to the operating member 14. The actuation part 52 can be disposed at the base member 12.

The actuation part 52 includes a projection 52A to face the electrical switch 46. The operating member 14 includes a receiving part 54. The receiving part 54 is spaced part from the actuation part 52 in the second operating direction D3. The electrical switch 46 and the attachment part 50 are disposed between the actuation part 52 and the receiving part 54 in the second operating direction D3. The additional operating member 18 is contactable with the receiving part 54. The additional operating member 18 is positioned at the second rest position P21 by the receiving part 54 in a state where the additional operating member 18 is in contact with the receiving part 54.

The bicycle operating device 10 comprises a switch biasing member 56. The switch biasing member 56 is disposed between the electrical switch 46 and the actuation part 52 to bias the additional operating member 18 toward the second rest position P21. Thus, the additional operating member 18 is positioned at the second rest position P21 by the receiving part 54 in a state where the additional operating member 18 is not operated by the user.

As seen in FIG. 8, the bicycle operating device 10 comprise a button element 58 to transmit, to the electrical switch 46, the movement of the additional operating member 18 in the second operating direction D3 relative to the operating member 14. The button element 58 is disposed at the attachment part 50 to face the actuation part 52 in the second operating direction D3. Specifically, the button element 58 is disposed to face the projection 52A in the second operating direction D3. In this embodiment, the switch biasing member 56 includes a coil spring. The switch biasing member 56 is held by the projection 52A and the button element 58.

The button element 58 is in contact with the projection 52A in a state where the additional operating member 18 is at the second operated position P22. This contact closes the electrical switch 46 to be activated by the input operation. The electrical switch 46 is open not to be activated by the input operation in a state where the additional operating member 18 is at the second rest position P21.

As seen in FIG. 4, the bicycle operating device 10 comprises a wireless communicator 60 electrically connected to the electrical switch 46 to wirelessly transmit a signal to the additional component BC2 in response to the input operation. The wireless communicator 60 is disposed at one of the base member 12, the operating member 14, and the additional operating member 18. In this embodiment, the wireless communicator 60 is disposed at the additional operating member 18. However, the wireless communicator 60 can be disposed at one of the base member 12 and the operating member 14.

As seen in FIG. 8, the wireless communicator 60 is attached to the additional operating member 18. In this embodiment, the wireless communicator 60 is integrally provided with the electrical switch 46 as a single unit. The bicycle operating device 10 comprises a substrate 62. The electrical switch 46 and the wireless communicator 60 are mounted on the substrate 62 and electrically connected to each other via the substrate 62. The substrate 62 is secured to the additional operating member 18 (e.g., the attachment part 50).

Figure 9:
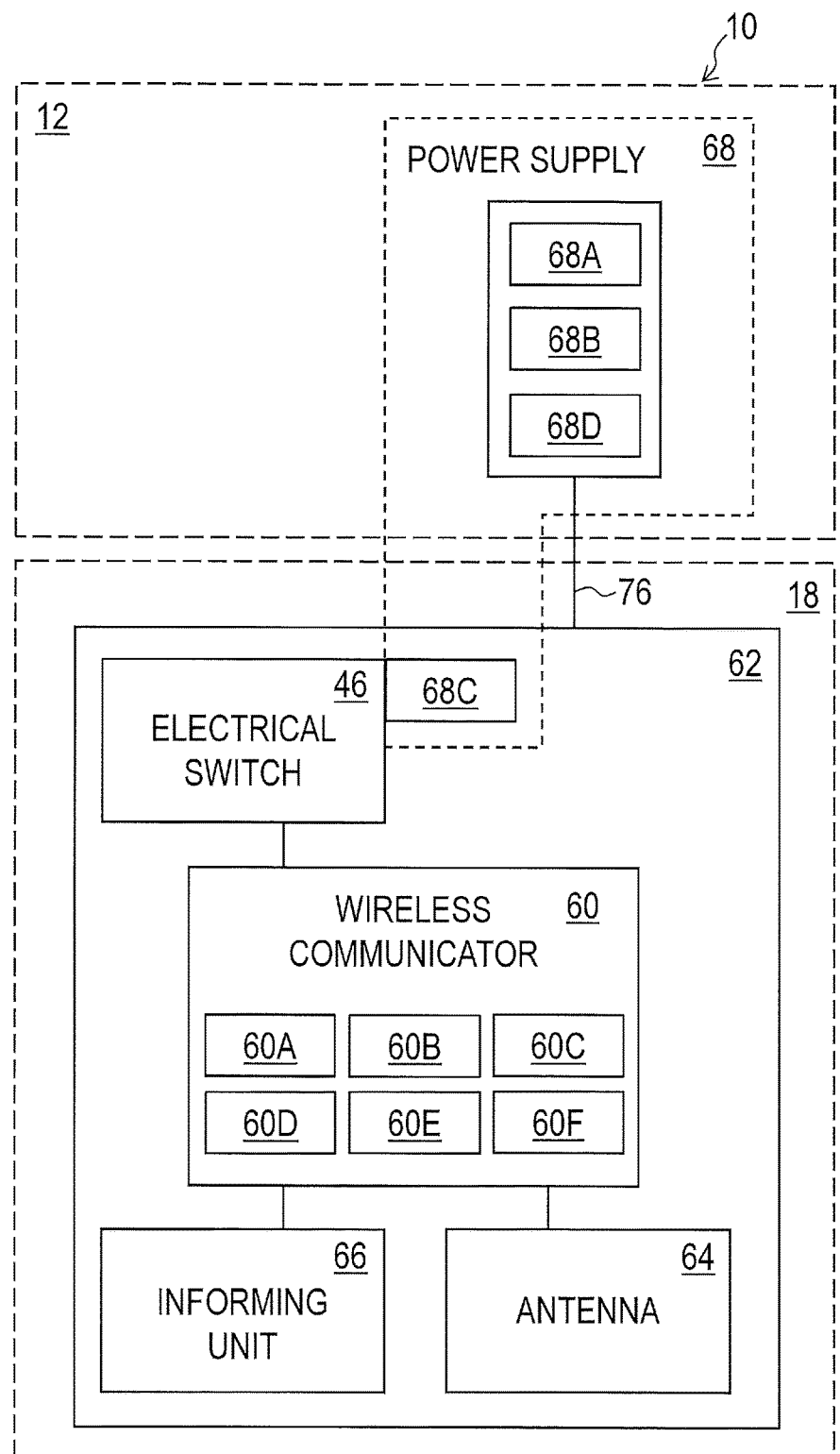
FIG. 9 is a schematic block diagram of the bicycle operating device illustrated in FIG. 1.

As seen in FIGS. 4 and 9, the bicycle operating device 10 comprises an antenna 64 connected to the wireless communicator 60. The antenna 64 is mounted on the substrate 62. The wireless communicator 60, the substrate 62, and the antenna 64 are disposed in the internal space 50C of the attachment part 50. The wireless communicator 60 wirelessly transmits the wireless signal based on the input operation via the antenna 64. The antenna 64 can be included in the wireless communicator 60 or can be integrally provided with the wireless communicator 60 as a single module or unit.

In this embodiment, as seen in FIG. 9, the wireless communicator 60 includes a processor 60A, a memory 60B, a signal generating circuit 60C, a signal transmitting circuit 60D, and a signal receiving circuit 60E. Thus, the wireless communicator 60 can also be referred to as a wireless communication circuit 60 in the present application. The processor 60A includes a central processing unit (CPU) and a memory controller. The memory 60B is connected to the processor 60A. The memory 60B includes a read only memory (ROM) and a random access memory (RAM). The ROM includes a non-transitory computer-readable storage medium. The RAM includes a transitory computer-readable storage medium. The memory 60B includes storage areas each having an address in the ROM and the RAM. The processor 60A controls the memory 60B to store data in the storage areas of the memory 60B and reads data from the storage areas of the memory 60B. The memory 60B (e.g., the ROM) stores a program. The program is read into the processor 60A, and thereby functions of the wireless communicator 60 (e.g., at least part of functions of the signal generating circuit 60C and the signal transmitting circuit 60D).

The signal generating circuit 60C generates wireless signals based on the input operation received by the electrical switch 46. The signal generating circuit 60C superimposes digital signals on carrier wave using a predetermined wireless communication protocol to generate the wireless signals. The signal transmitting circuit 60D transmits the wireless signal via the antenna 64 in response to the input operation received by the electrical switch 46. In this embodiment, the signal generating circuit 60C can encrypt control information (e.g., shift information) to generate encrypted wireless signals. The signal generating circuit 60C encrypts digital signals stored in the memory 60B using a cryptographic key. The signal transmitting circuit 60D transmits the encrypted wireless signals. Thus, the wireless communicator 60 wirelessly transmits the wireless signal to upshift or downshift the additional component BC2 when the electrical switch 46 is closed to be activated by the input operation.

Further, the signal receiving circuit 60E receives a wireless signal from the additional component BC2 via the antenna 64. In this embodiment, the signal receiving circuit 60E decodes the wireless signal to recognize information wirelessly transmitted from the additional component BC2. The signal receiving circuit 60E may decrypt the encrypted wireless signal using the cryptographic key. Namely, the wireless communicator 60 is configured to transmit a wireless signal to control other electrical bicycle components and to receive a wireless signal to recognize information from other electrical bicycle components. In other words, the wireless communicator 60 is provided as a wireless transmitter and a wireless receiver. The other electrical bicycle components can include the electric suspension and the electric seatpost in addition to the additional component BC2. In this embodiment, the wireless communicator 60 is integrally provided as a single module or unit. However, the wireless communicator 60 can be constituted of a wireless transmitter and a wireless receiver which are provided as separate modules or units arranged at different positions from each other. The signal receiving circuit 60E can be omitted from the wireless communicator 60.

As seen in FIGS. 4 and 9, the bicycle operating device 10 further comprises an informing unit 66. The informing unit 66 is electrically connected to the wireless communicator 60 to inform a user of a status of the wireless communicator 60. The informing unit 66 is disposed on at least one of the base member 12, the operating member 14, and the additional operating member 18. In this embodiment, the informing unit 66 is disposed on the additional operating member 18. However, the informing unit 66 can be disposed on at least one of the base member 12 and the operating member 14 instead of or in addition to on the additional operating member 18. Examples of the status of the wireless communicator 60 include a signal transmission status and a power supply status.

As seen in FIG. 9, the informing unit 66 is mounted on the substrate 62. The informing unit 66 is disposed in the internal space 50C of the attachment part 50. The informing unit 66 is electrically connected to the wireless communicator 60 via the substrate 62. The informing unit 66 includes a light emitting element such as a light emitting diode (LED). However, the informing unit 66 can include other elements such as a buzzer instead of or in addition to the light emitting element. Light from the informing unit 66 is visible from outside of the bicycle operating device 10 via a clear window 67 (FIG. 4).

As seen in FIG. 9, the bicycle operating device 10 comprises a power supply 68 electrically connected to the wireless communicator 60 to supply electrical power to the wireless communicator 60. In this embodiment, the power supply 68 is electrically connected to the wireless communicator 60 to supply electric energy (e.g., a power source voltage) to the wireless communicator 60. The power supply 68 supplies the electric energy to other elements via the wireless communicator 60. However, the power supply 68 can be electrically connected to the other elements without via the wireless communicator 60.

The power supply 68 is disposed on at least one of the base member 12, the operating member 14, and the additional operating member 18. The power supply 68 is disposed at the base member 12 and the additional operating member 18. However, the power supply 68 can be disposed at the operating member 14 instead of or in addition to at the base member 12 and the additional operating member 18.

Figure 10:
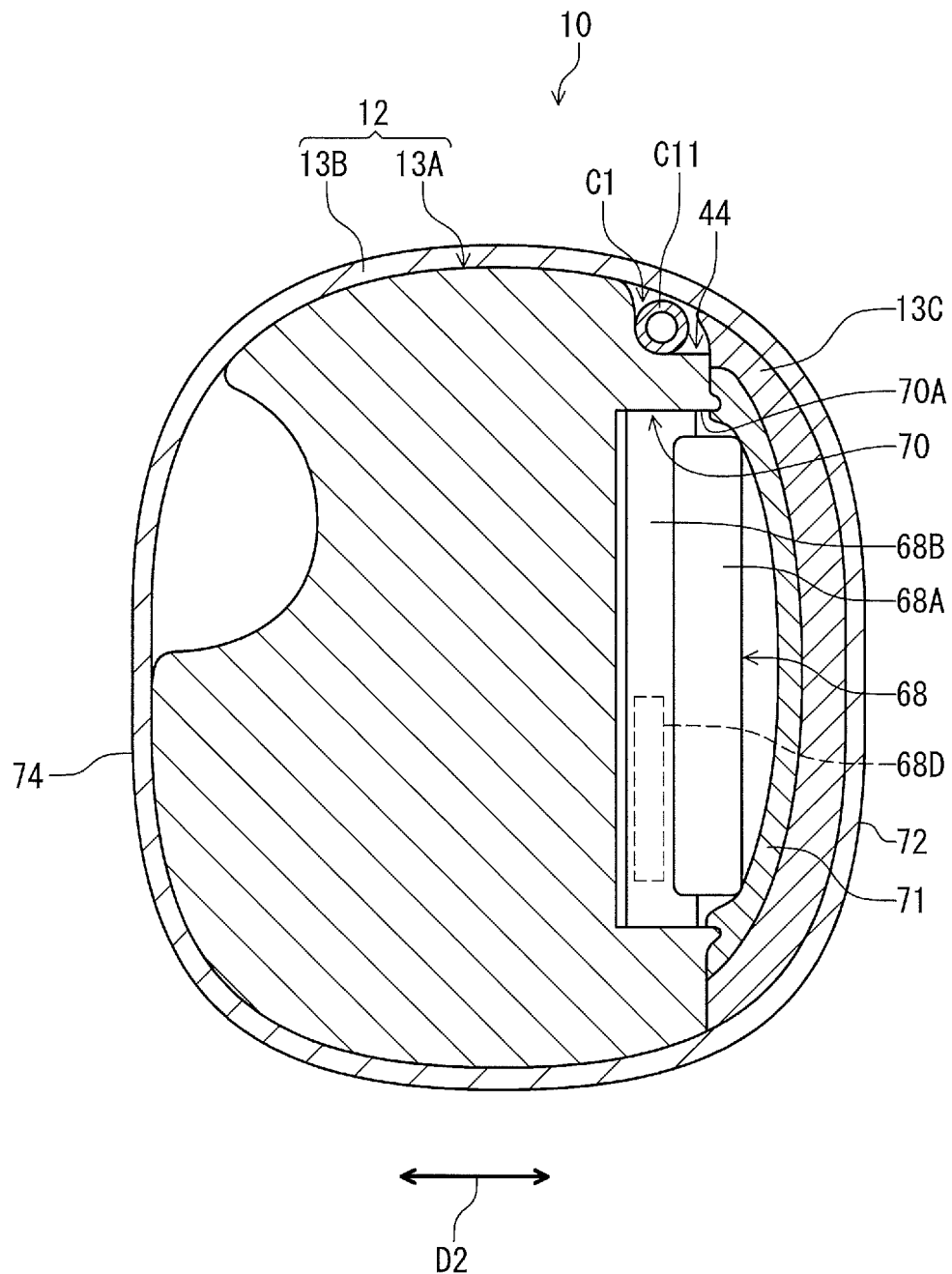
FIG. 10 is a cross-sectional view of the bicycle operating device taken along line X-X of FIG. 4.

In this embodiment, the power supply 68 includes a battery 68A and a battery holder 68B. The battery 68A is detachably mounted to the battery holder 68B. Examples of the battery 68A include a primary battery such as a lithium manganese dioxide battery, and a secondary battery such as a lithium-ion secondary battery. In this embodiment, the battery 68A is a primary button battery. As seen in FIG. 10, the battery 68A and the battery holder 68B are disposed in the base member 12. The battery holder 68B is secured to the base member 12 (e.g., the base body 13A).

As seen in FIGS. 8 and 9, the power supply 68 includes an electric-energy generation element 68C and a rectifying circuit 68D. The electric-energy generation element 68C is disposed at the additional operating member 18. The rectifying circuit 68D is disposed at the base member 12. The electric-energy generation element 68C generates the electric energy using pressure and/or vibration. In this embodiment, the electric-energy generation element 68C generates electric energy (e.g., alternating current) using pressure and/or vibration caused by a movement of at least one of the operating member 14, the additional operating member 18, and the button element 58. Examples of the electric-energy generation element 68C includes a piezoelectric element. The electric-energy generation element 68C is attached to the electrical switch 46 and is disposed between the electrical switch 46 and the button element 58. However, the electric-energy generation element 68C can be disposed at other positions. The electric-energy generation element 68C is electrically connected to the substrate 62. The electric-energy generation element 68C is electrically connected to the wireless communicator 60 via the substrate 62. The rectifying circuit 68D is electrically connected to the electric-energy generation element 68C to rectify the electric energy generated by the electric-energy generation element

68C. The rectifying circuit 68D is provided in the battery holder 68B and is electrically connected to the battery holder 68B. Since the electric-energy generation element 68C and the rectifying circuit 68D have been well known in the electronics field, they will not be described and/or illustrated in detail here for the sake of brevity. The electric-energy generation element 68C and the rectifying circuit 68D can be omitted from the power supply 68. The power source voltage is applied from the power supply 68 to the wireless communicator 60.

As seen in FIG. 9, the wireless communicator 60 includes a voltage regulator 60F. The voltage regulator 60F regulates the power source voltage to a level at which various circuits of the wireless communicator 60 and the informing unit 66 can properly operate. The voltage regulator 60F supplies the regulated voltage to the processor 60A, the memory 60B, the signal generating circuit 60C, the signal transmitting circuit 60D, the signal receiving circuit 60E, and the informing unit 66. The voltage regulator 60F can be provided in the power supply 68.

The voltage regulator 60F switches the power source voltage between the battery 68A and the electric-energy generation element 68C. At first, for example, the wireless communicator 60 preferentially uses the electric energy generated by the electric-energy generation element 68C to transmit the wireless signal based on the input operation received by the electrical switch 46. When the transmission of the wireless signal is completed using only the electric energy generated by the electric-energy generation element 68C, the voltage regulator 60F interrupts supply of the electric energy from the battery 68A to reduce the standby power consumption of the battery 68A. When the transmission of the wireless signal is not completed due to insufficient electric energy, the wireless communicator 60 uses the electric energy supplied from the battery 68A to transmit the wireless signal based on the input operation received by the electrical switch 46. The remaining electric energy generated by the electric-energy generation element 68C can be charged to a rechargeable battery (not shown) if necessary. In such an embodiment, the rechargeable battery is provided in the power supply 68 instead of or in addition to the battery 68A.

As seen in FIG. 10, the base member 12 includes an accommodation space 70 in which the at least one of the wireless communicator 60 and the power supply 68 is at least partly provided. In this embodiment, the power supply 68 is provided in the accommodation space 70. The wireless communicator 60 is provided outside the accommodation space 70. The accommodation space 70 includes an outer opening 70A. The hose cover 13C is attached to the base body 13A to at least partly cover the outer opening 70A of the accommodation space 70. A seal member 71 is provided between the accommodation space 70 and the hose cover 13C.

As seen in FIG. 3, the bicycle operating device 10 is configured to be mounted on the bicycle having the transverse center plane CP. The base member 12 includes a first lateral surface 72 and a second lateral surface 74. The first lateral surface 72 is disposed closer to the transverse center plane CP than the second lateral surface 74 in the mounting state of the bicycle operating device 10. As seen in FIG. 10, the power supply 68 is partly disposed between the first lateral surface 72 and the second lateral surface 74 in the first direction D2. The battery 68A, the battery holder 68B, and the rectifying circuit 68D are disposed between the first lateral surface 72 and the second lateral surface 74 in the first direction D2. The first lateral surface 72 is closer to the power supply 68 (the battery 68A, the battery holder 68B, and the rectifying circuit 68D) than the second lateral surface 74 in the first direction D2.

As seen in FIG. 4, the bicycle operating device 10 further comprises a cable 76 electrically connecting between the wireless communicator 60 and the power supply 68. The cable 76 extends from the wireless communicator 60 to the power supply 68 along the operating member 14 and/or the additional operating member 18. As seen in FIG. 9, the cable 76 electrically connects the substrate 62 to the battery holder 68B. The cable 76 can be omitted from the bicycle operating device 10 in a case where the wireless communicator 60 and the power supply 68 are integrally provided with each other as a single unit.

As seen in FIG. 4, at least one of the wireless communicator 60 and the power supply 68 is at least partly disposed at the base member 12. At least one of the wireless communicator 60 and the power supply 68 is at least partly disposed at the operating member 14. At least one of the wireless communicator 60 and the power supply 68 is at least partly disposed at the additional operating member 18.

In this embodiment, the wireless communicator 60 is entirely disposed at the additional operating member 18. However, the wireless communicator 60 can be partly disposed at the additional operating member 18. The wireless communicator 60 can be at least partly disposed at one of the base member 12 and the operating member 14.

The power supply 68 is at least partly disposed at the base member 12. The power supply 68 is partly disposed at the base member 12. The battery 68A, the battery holder 68B, and the rectifying circuit 68D are disposed at the base member 12. The electric-energy generation element 68C is disposed at the additional operating member 18. However, the power supply 68 can be entirely disposed at one of the base member 12, the operating member 14, and the additional operating member 18.

As seen in FIG. 4, at least part of the hydraulic unit 26 is disposed closer to the second end 12B than the first pivot axis A1 when viewed from the first direction D2 parallel to the first pivot axis A1. The at least part of the hydraulic unit 26 is disposed closer to the second end 12B than the first pivot shaft 20. In this embodiment, the hydraulic unit 26 is partly disposed closer to the second end 12B than the first pivot axis A1 when viewed from the first direction D2 parallel to the first pivot axis A1. The hydraulic unit 26 is partly disposed closer to the second end 12B than the first pivot shaft 20. However, the hydraulic unit 26 can be entirely disposed closer to the second end 12B than the first pivot axis A1 when viewed from the first direction D2 parallel to the first pivot axis A1. The hydraulic unit 26 can be entirely disposed closer to the second end 12B than the first pivot shaft 20.

As seen in FIG. 6, at least one of the cylinder bore 28, the piston 30, and the hydraulic reservoir 32 is at least partly disposed closer to the second end 12B than the first pivot axis A1 when viewed from the first direction D2. At least one of the cylinder bore 28 and the piston 30 is at least partly disposed closer to the second end 12B than the first pivot axis A1 when viewed from the first direction D2.

In this embodiment, the cylinder bore 28, the piston 30, and the hydraulic reservoir 32 are entirely disposed closer to the second end 12B than the first pivot axis A1 when viewed from the first direction D2. The piston rod 40 is partly disposed closer to the second end 12B than the first pivot axis A1 when viewed from the first direction D2 in an initial state where the piston 30 is at the initial position P31. However, at least one of the cylinder bore 28, the piston 30, and the hydraulic reservoir 32 can be partly disposed closer to the second end 12B than the first pivot axis A1 when viewed from the first direction D2. The piston rod 40 can be entirely disposed closer to the second end 12B than the first pivot axis A1 when viewed from the first direction D2 in the initial state of the hydraulic unit 26. Furthermore, at least one of the hydraulic reservoir 32, the return spring 38, and the piston rod 40 can be omitted from the hydraulic unit 26.

As seen in FIG. 4, at least one of the wireless communicator 60 and the power supply 68 is disposed closer to the first end 12A than the first pivot axis A1 when viewed from the first direction D2. The at least one of the wireless communicator 60 and the power supply 68 is at least partly disposed closer to the first end 12A than the first pivot shaft 20. The power supply 68 is at least partly closer to the first end 12A than the first pivot axis A1 when viewed from the first direction D2. The at least one of the wireless communicator 60 and the power supply 68 is at least partly disposed below the hose passageway 44 when viewed from the first direction D2 in the mounting state where the bicycle operating device 10 is mounted to the bicycle handlebar H.

In this embodiment, the wireless communicator 60 and the power supply 68 are entirely disposed closer to the first end 12A than the first pivot axis A1 when viewed from the first direction D2. The wireless communicator 60 and the power supply 68 are entirely disposed closer to the first end 12A than the first pivot shaft 20. The wireless communicator 60 is entirely disposed closer to the first end 12A (the first pivot shaft 20) than the first pivot axis A1 when viewed from the first direction D2. The battery 68A, the battery holder 68B, the electric-energy generation element 68C, and the rectifying circuit 68D are entirely closer to the first end 12A than the first pivot axis A1. However, at least one of the wireless communicator 60 and the power supply 68 can be partly closer to the first end 12A than the first pivot axis A1 when viewed from the first direction D2. At least one of the battery 68A, the battery holder 68B, the electric-energy generation element 68C, and the rectifying circuit 68D can be at least partly disposed closer to the first end 12A than the first pivot axis A1.

The wireless communicator 60 and the power supply 68 are entirely disposed below the hose passageway 44 when viewed from the first direction D2 in the mounting state where the bicycle operating device 10 is mounted to the bicycle handlebar H. However, at least one of the wireless communicator 60 and the power supply 68 can be at least partly disposed below the hose passageway 44 when viewed from the first direction D2 in the mounting state of the bicycle operating device 10.

As seen in FIG. 4, at least part of the hydraulic unit 26 is disposed above the first pivot axis A1 when viewed from the first direction D2 parallel to the first pivot axis A1 in the mounting state where the bicycle operating device 10 is mounted to the bicycle handlebar H. The at least part of the hydraulic unit 26 is disposed above the first pivot shaft 20 when viewed from the first direction D2 in the mounting state of the bicycle operating device 10. The at least part of the hydraulic unit 26 is disposed above the first pivot axis A1 when viewed from the first direction D2 in a reference state where the clamp center axis CA is disposed along a vertical direction VD and where the free end 14A is disposed below the mounting clamp 16.

The vertical direction VD is defined parallel to a gravity direction. In this embodiment, for example, a smaller inclination angle AG1 defined between the clamp center axis CA and the vertical direction VD is in a range of approximately 0 degree to approximately 60 degrees in the reference state of the bicycle operating device 10. The mounting state of the bicycle operating device 10 can be also referred to as the reference state of the bicycle operating device 10.

The hydraulic unit 26 is partly disposed above the first pivot axis A1 when viewed from the first direction D2 in the mounting state of the bicycle operating device 10 and in the initial state of the hydraulic unit 26. The hydraulic unit 26 is partly disposed above the first pivot shaft 20 when viewed from the first direction D2 in the mounting state of the bicycle operating device 10 and in the initial state of the hydraulic unit 26. The hydraulic unit 26 is partly disposed above the first pivot axis A1 when viewed from the first direction D2 in the reference state of the bicycle operating device 10 and in the initial state of the hydraulic unit 26. However, the hydraulic unit 26 can be entirely disposed above the first pivot axis A1 when viewed from the first direction D2 in the mounting state of the bicycle operating device 10 and in the initial state of the hydraulic unit 26. The hydraulic unit 26 can be entirely disposed above the first pivot shaft 20 when viewed from the first direction D2 in the mounting state of the bicycle operating device 10 and in the initial state of the hydraulic unit 26. The hydraulic unit 26 can be entirely disposed above the first pivot axis A1 when viewed from the first direction D2 in the reference state of the bicycle operating device 10 and in the initial state of the hydraulic unit 26.

As seen in FIG. 6, at least one of the cylinder bore 28, the piston 30, and the hydraulic reservoir 32 is at least partly disposed above the first pivot axis A1 when viewed from the first direction D2 in the mounting state of the bicycle operating device 10. At least one of the cylinder bore 28 and the piston 30 is at least partly disposed above the first pivot axis A1 when viewed from the first direction D2 in the mounting state of the bicycle operating device 10.

In this embodiment, the cylinder bore 28, the piston 30, and the hydraulic reservoir 32 are entirely disposed above the first pivot axis A1 when viewed from the first direction D2 in the mounting state of the bicycle operating device 10. The piston rod 40 is partly disposed above the first pivot axis A1 when viewed from the first direction D2 in the mounting state of the bicycle operating device 10. However, at least one of the cylinder bore 28, the piston 30, and the hydraulic reservoir 32 can be partly disposed above the first pivot axis A1 when viewed from the first direction D2 in the mounting state of the bicycle operating device 10. The piston rod 40 can be entirely disposed above the first pivot axis A1 when viewed from the first direction D2 in the mounting state of the bicycle operating device 10.

As seen in FIG. 4, at least one of the wireless communicator 60 and the power supply 68 is at least partly disposed below the first pivot axis A1 when viewed from the first direction D2 in the mounting state of the bicycle operating device 10. The at least one of the wireless communicator 60 and the power supply 68 is at least partly disposed below the first pivot shaft 20 when viewed from the first direction D2 in the mounting state of the bicycle operating device 10. The at least one of the wireless communicator 60 and the power supply 68 is at least partly disposed below the first pivot axis A1 when viewed from the first direction D2 in the reference state of the bicycle operating device 10.

In this embodiment, the wireless communicator 60 is entirely disposed below the first pivot axis A1 when viewed from the first direction D2 in the mounting state of the bicycle operating device 10. The power supply 68 is partly disposed below the first pivot axis A1 when viewed from the first direction D2 in the mounting state of the bicycle operating device 10. The wireless communicator 60 is entirely disposed below the first pivot shaft 20 when viewed from the first direction D2 in the mounting state of the bicycle operating device 10. The power supply 68 is partly disposed below the first pivot shaft 20 when viewed from the first direction D2 in the mounting state of the bicycle operating device 10. The wireless communicator 60 is entirely disposed below the first pivot axis A1 when viewed from the first direction D2 in the reference state of the bicycle operating device 10. The power supply 68 is partly disposed below the first pivot axis A1 when viewed from the first direction D2 in the reference state of the bicycle operating device 10.

As seen in FIG. 4, at least part of the hydraulic unit 26 is disposed farther from the free end 14A than the first pivot axis A1 when viewed from the first direction D2. The at least part of the hydraulic unit 26 is disposed farther from the free end 14A than the first pivot shaft 20 when viewed from the first direction D2. In this embodiment, the hydraulic unit 26 is partly disposed farther from the free end 14A than the first pivot axis A1 when viewed from the first direction D2. The hydraulic unit 26 is partly disposed farther from the free end 14A than the first pivot shaft 20 when viewed from the first direction D2. However, the hydraulic unit 26 can be entirely disposed farther from the free end 14A than the first pivot axis A1 when viewed from the first direction D2. The hydraulic unit 26 can be entirely disposed farther from the free end 14A than the first pivot shaft 20 when viewed from the first direction D2.

At least one of the cylinder bore 28, the piston 30, and the hydraulic reservoir 32 is at least partly disposed farther from the free end 14A than the first pivot axis A1 when viewed from the first direction D2. At least one of the cylinder bore 28 and the piston 30 is at least partly disposed farther from the free end 14A than the first pivot axis A1 when viewed from the first direction D2. In this embodiment, the cylinder bore 28, the piston 30, and the hydraulic reservoir 32 are entirely disposed farther from the free end 14A than the first pivot axis A1 when viewed from the first direction D2. The piston rod 40 is partly disposed farther from the free end 14A than the first pivot axis A1 when viewed from the first direction D2. However, at least one of the cylinder bore 28, the piston 30, and the hydraulic reservoir 32 can be partly disposed farther from the free end 14A than the first pivot axis A1 when viewed from the first direction D2. The piston rod 40 can be entirely disposed farther from the free end 14A than the first pivot axis A1 when viewed from the first direction D2.

As seen in FIG. 4, at least one of the wireless communicator 60 and the power supply 68 is at least partly disposed closer to the free end 14A than the first pivot axis A1 when viewed from the first direction D2. The at least one of the wireless communicator 60 and the power supply 68 is at least partly disposed closer to the free end 14A than the first pivot shaft 20 when viewed from the first direction D2. In this embodiment, the wireless communicator 60 is entirely disposed closer to the free end 14A than the first pivot axis A1 when viewed from the first direction D2. The wireless communicator 60 is entirely disposed closer to the free end 14A than the first pivot shaft 20 when viewed from the first direction D2. However, the wireless communicator 60 can be partly disposed closer to the free end 14A than the first pivot axis A1 when viewed from the first direction D2. The wireless communicator 60 can be partly disposed closer to the free end 14A than the first pivot shaft 20 when viewed from the first direction D2.

As seen in FIG. 4, the hydraulic unit 26 is at least partly disposed closer to the second end 12B than at least one of the wireless communicator 60 and the power supply 68 when viewed from the first direction D2 parallel to the first pivot axis A1. In this embodiment, the hydraulic unit 26 is entirely disposed closer to the second end 12B than the wireless communicator 60 and the power supply 68 when viewed from the first direction D2 parallel to the first pivot axis A1. However, the hydraulic unit 26 can be partly disposed closer to the second end 12B than at least one of the wireless communicator 60 and the power supply 68 when viewed from the first direction D2.

At least one of the cylinder bore 28, the piston 30, and the hydraulic reservoir 32 is at least partly disposed closer to the second end 12B than the at least one of the wireless communicator 60 and the power supply 68 when viewed from the first direction D2. At least one of the cylinder bore 28 and the piston 30 is at least partly disposed closer to the second end 12B than the at least one of the wireless communicator 60 and the power supply 68 when viewed from the first direction D2.

In this embodiment, the cylinder bore 28, the piston 30, and the hydraulic reservoir 32 are entirely disposed closer to the second end 12B than the wireless communicator 60 and the power supply 68 when viewed from the first direction D2. The piston rod 40 is entirely disposed closer to the second end 12B than the wireless communicator 60 when viewed from the first direction D2. The piston rod 40 is partly disposed closer to the second end 12B than the power supply 68 when viewed from the first direction D2. However, at least one of the cylinder bore 28, the piston 30, and the hydraulic reservoir 32 can be partly disposed closer to the second end 12B than at least one of the wireless communicator 60 and the power supply 68 when viewed from the first direction D2. The piston rod 40 can be partly disposed closer to the second end 12B than the wireless communicator 60 when viewed from the first direction D2. The piston rod 40 can be entirely disposed closer to the second end 12B than the power supply 68 when viewed from the first direction D2.

In the above positional relationship among the first end 12A, the second end 12B, the first pivot axis A1, the first pivot shaft 20, the hydraulic unit 26, the wireless communicator 60, and the power supply 68, the element "first end 12A" can be read as "mounting surface 12E", and the element "second end 12B" can be read as "end surface 12F."

Second Embodiment

A bicycle operating device 210 in accordance with a second embodiment will be described below referring to FIGS. 11 to 13. The bicycle operating device 210 has the same structure and/or configuration as those of the bicycle operating device 10 except for the arrangement of the power supply 68. Thus, elements having substantially the same function as those in the first embodiment will be numbered the same here, and will not be described and/or illustrated again in detail here for the sake of brevity.

Figure 11:
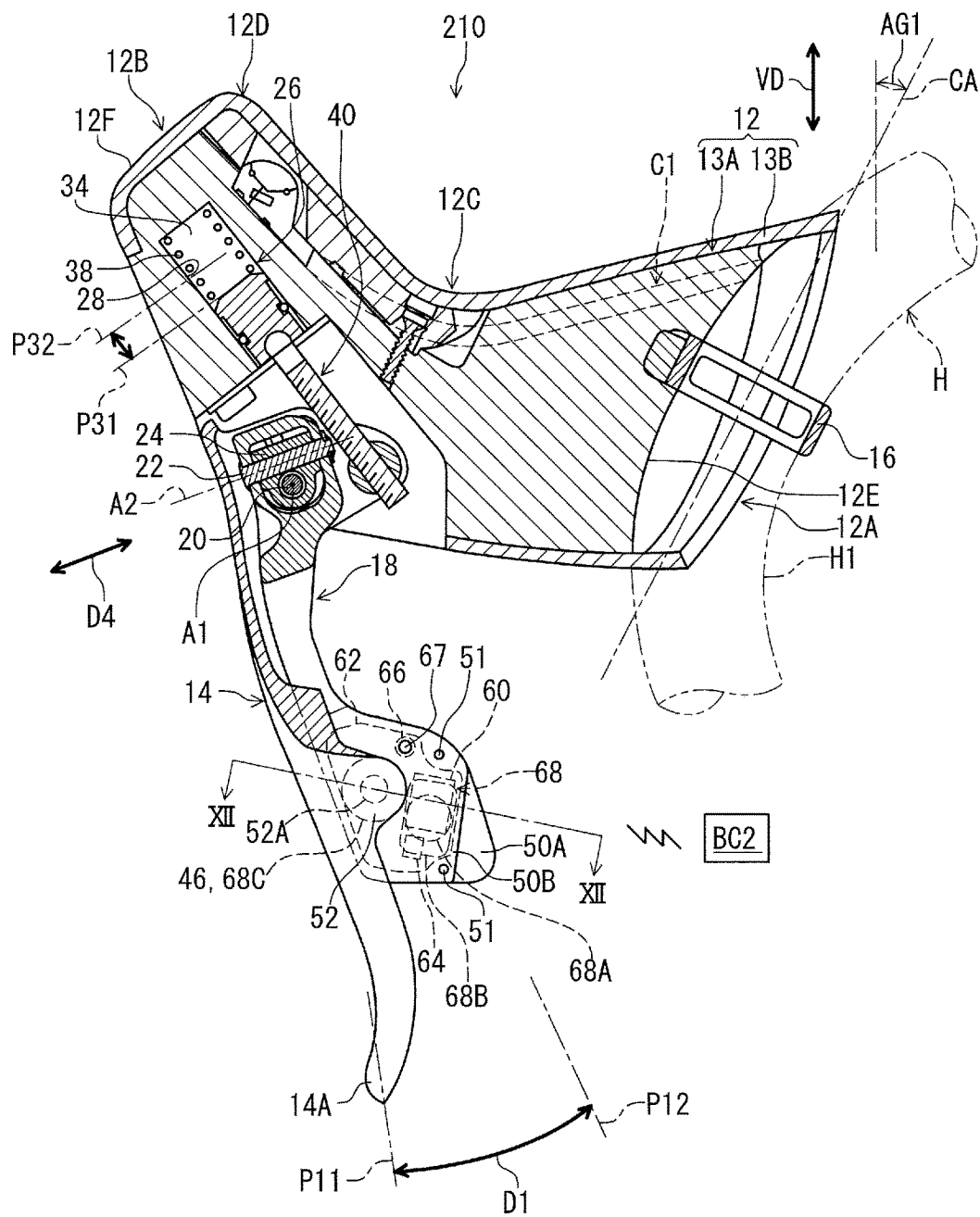
FIG. 11 is a cross-sectional view of a bicycle operating device in accordance with a second embodiment.
Figure 12:
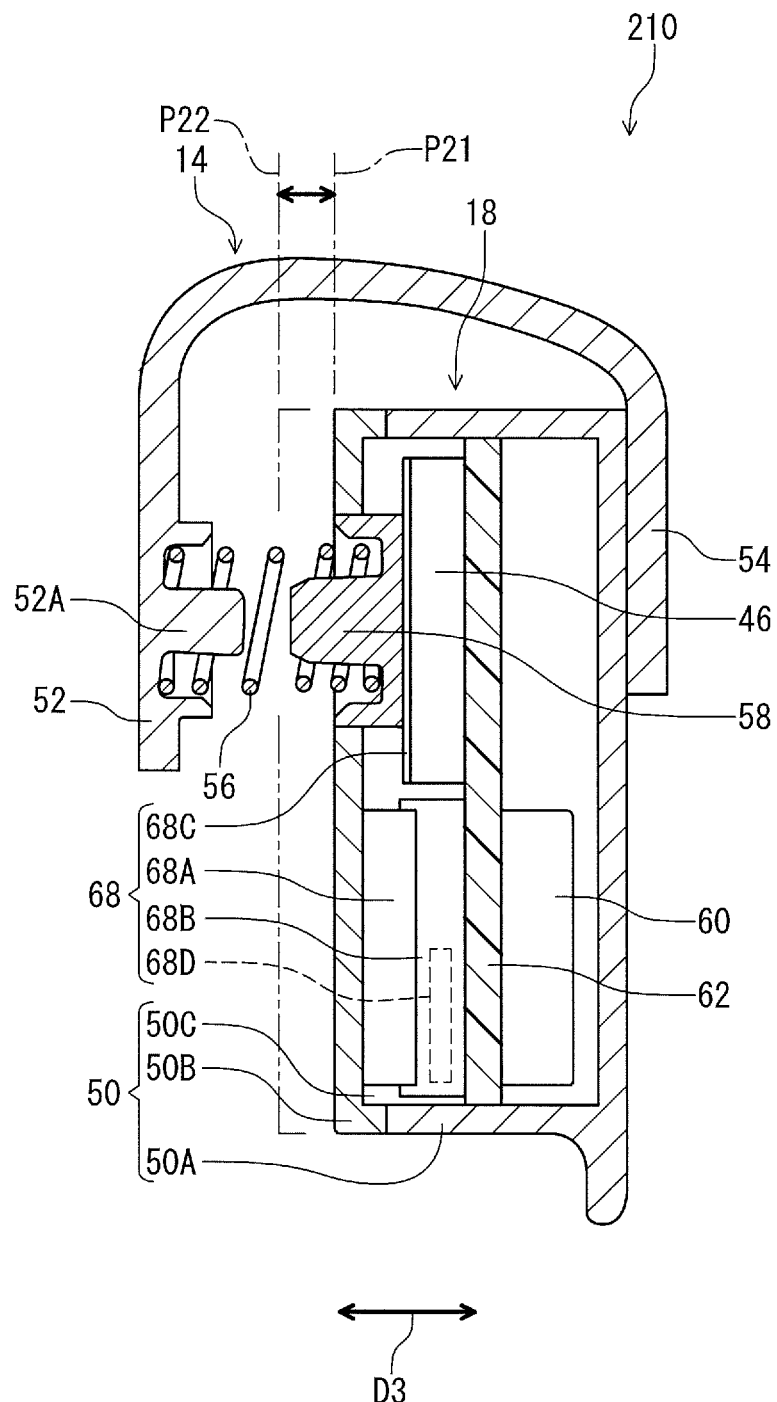
FIG. 12 is a cross-sectional view of the bicycle operating device taken along line XII-XII of FIG. 11.
Figure 13:
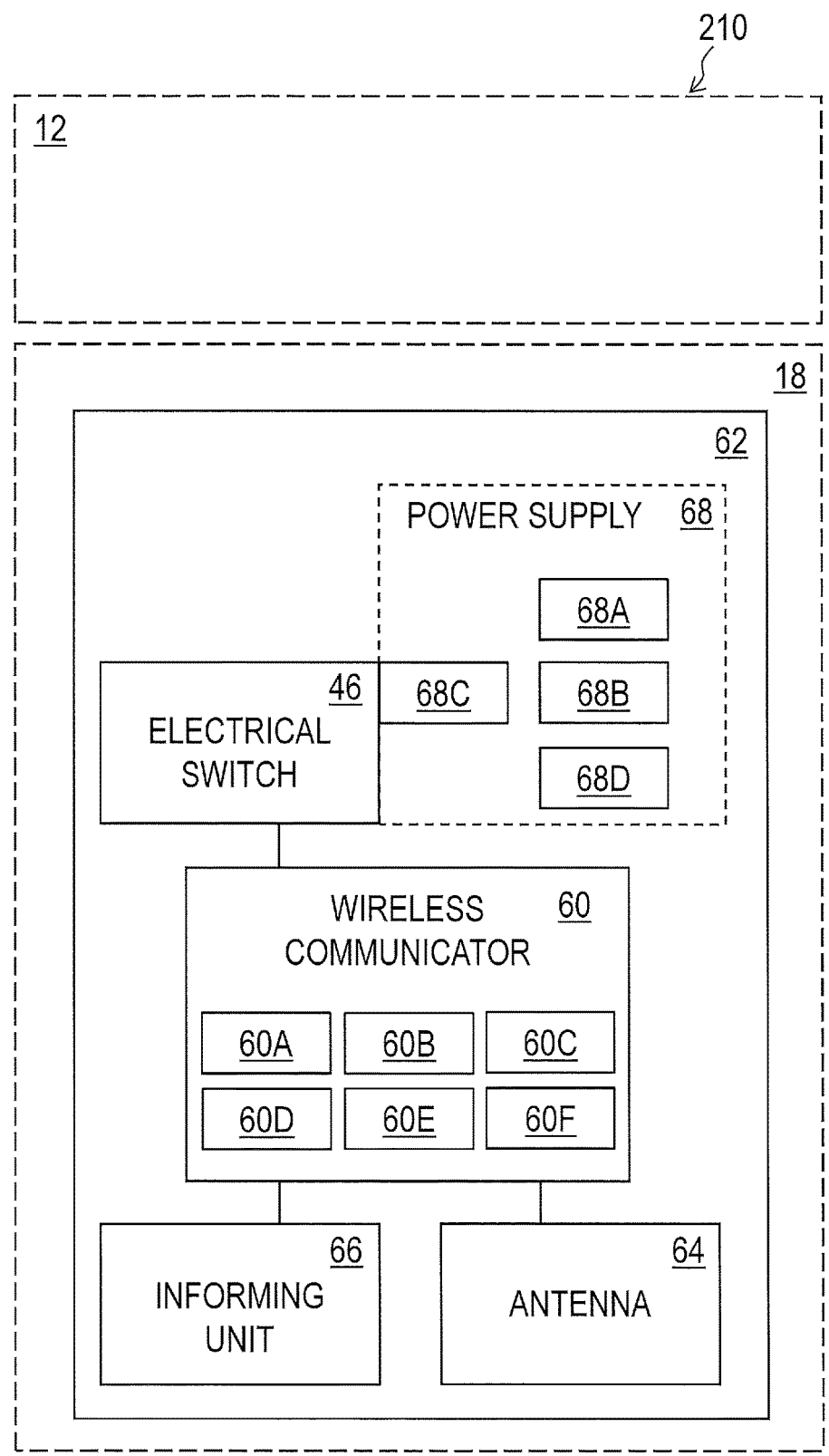
FIG. 13 is a schematic block diagram of the bicycle operating device illustrated in FIG. 11.

As seen in FIGS. 11 to 13, in the bicycle operating device 210 of the second embodiment, the wireless communicator 60 and the power supply 68 are disposed at the additional operating member 18. The power supply 68 is entirely disposed at the additional operating member 18. The wireless communicator 60 and the power supply 68 are provided in the internal space 50C (FIG. 12) of the attachment part 50. Specifically, the battery 68A, the battery holder 68B, the electric-energy generation element 68C, and the rectifying circuit 68D are disposed at the additional operating member 18. The battery 68A, the battery holder 68B, and the rectifying circuit 68D are mounted on the substrate 62 and are electrically connected to the wireless communicator 60 via the substrate 62. The cable 76 is omitted from the bicycle operating device 210.

As seen in FIG. 11, the positional relationship among the first end 12A, the second end 12B, the first pivot axis A1, the first pivot shaft 20, the hydraulic unit 26, the wireless communicator 60, and the power supply 68 is substantially the same as that of the bicycle operating device 10 of the first embodiment.

In this embodiment, however, the wireless communicator 60 and the power supply 68 are partly disposed closer to the first end 12A than the first pivot axis A1 (the first pivot shaft 20) when viewed from the first direction D2. The power supply 68 is entirely disposed below the first pivot axis A1 (the first pivot shaft 20) when viewed from the first direction D2 in the mounting state (the reference state) of the bicycle operating device 10.

Third Embodiment

A bicycle operating device 310 in accordance with a third embodiment will be described below referring to FIGS. 14 to 16. The bicycle operating device 310 has the same structure and/or configuration as those of the bicycle operating device 10 except for the arrangement of the wireless communicator 60. Thus, elements having substantially the same function as those in the above embodiments will be numbered the same here, and will not be described and/or illustrated again in detail here for the sake of brevity.

Figure 14:
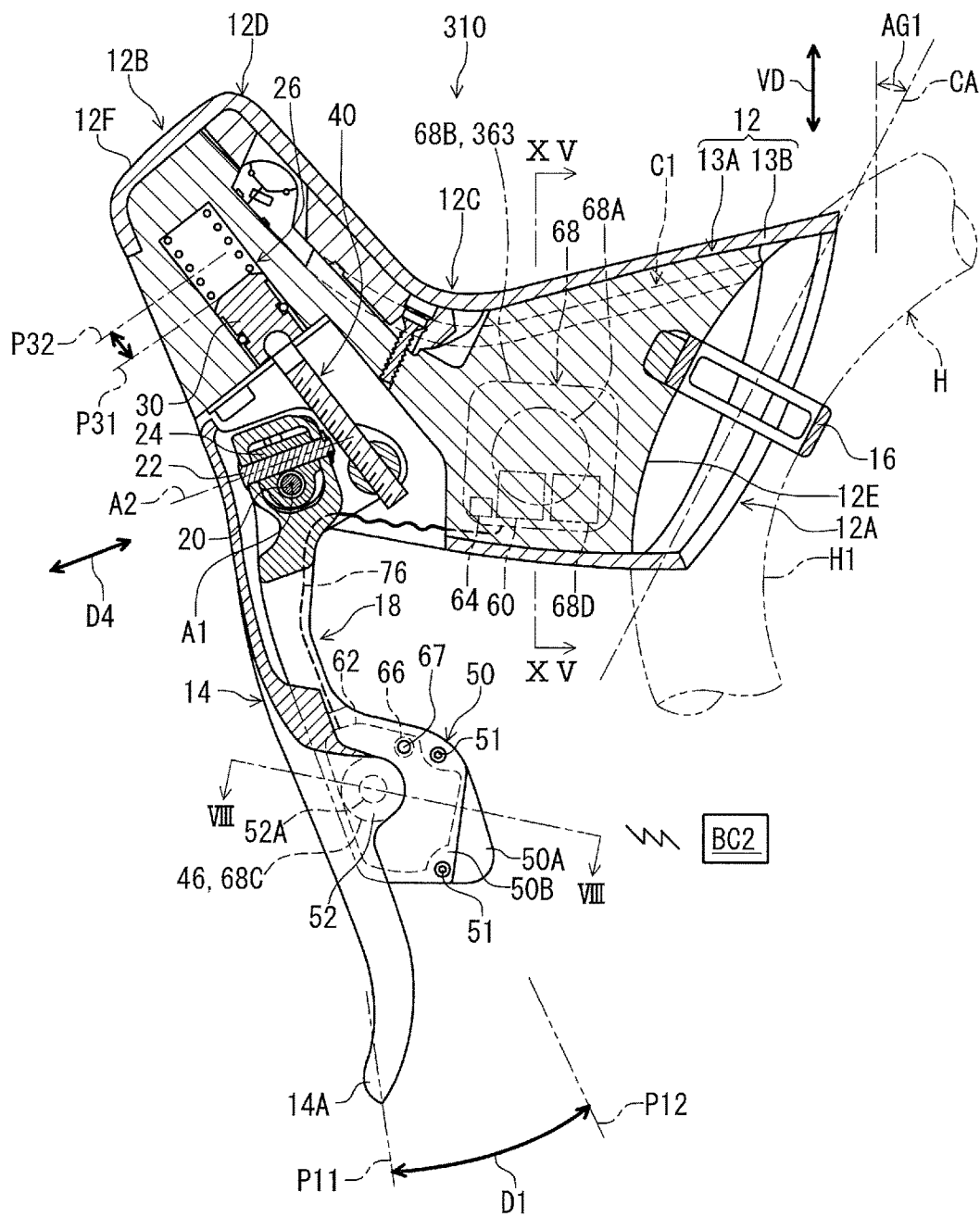
FIG. 14 is a cross-sectional view of a bicycle operating device in accordance with a third embodiment.
Figure 15:
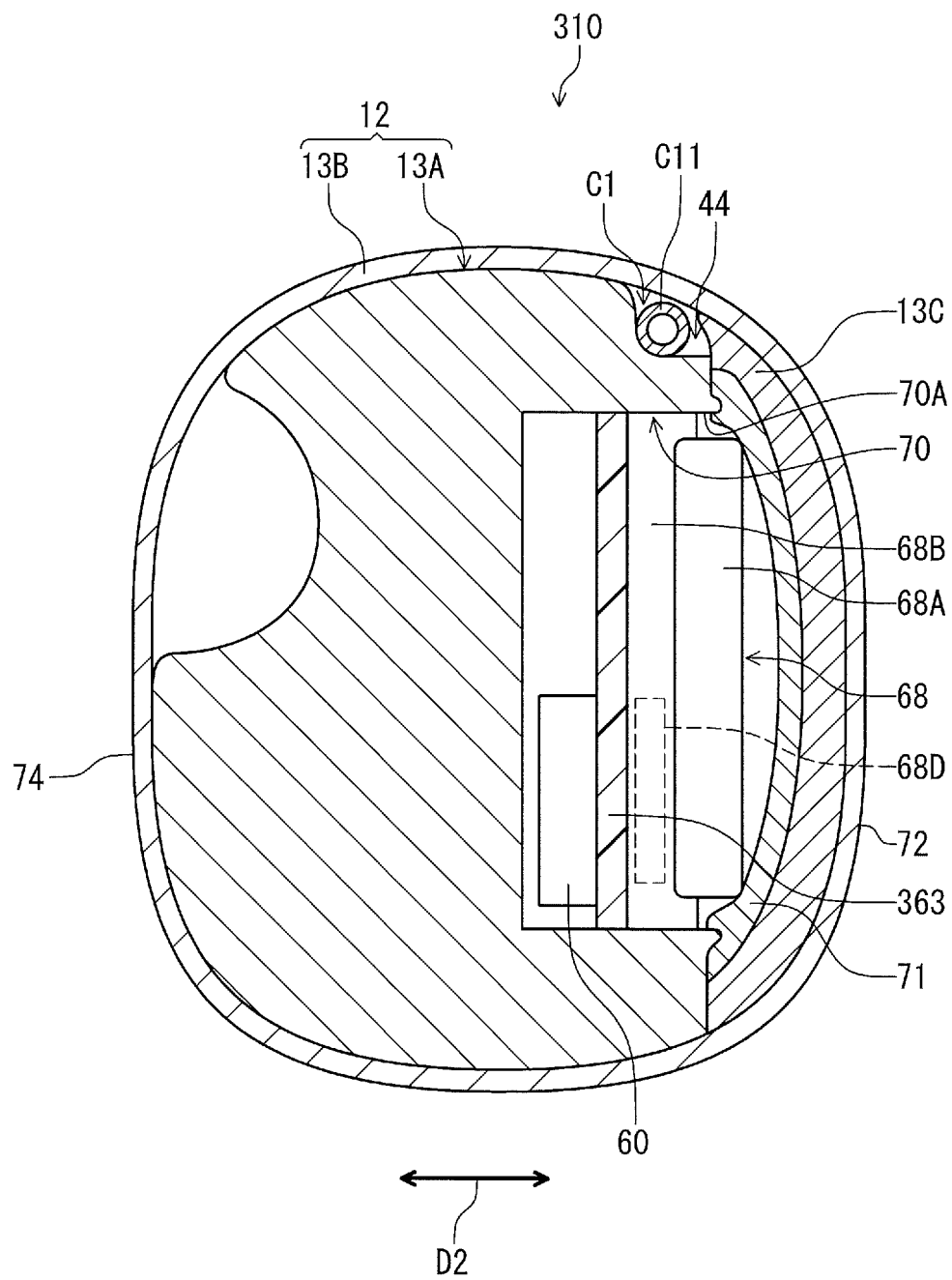
FIG. 15 is a cross-sectional view of the bicycle operating device taken along line XV-XV of FIG. 14.
Figure 16:
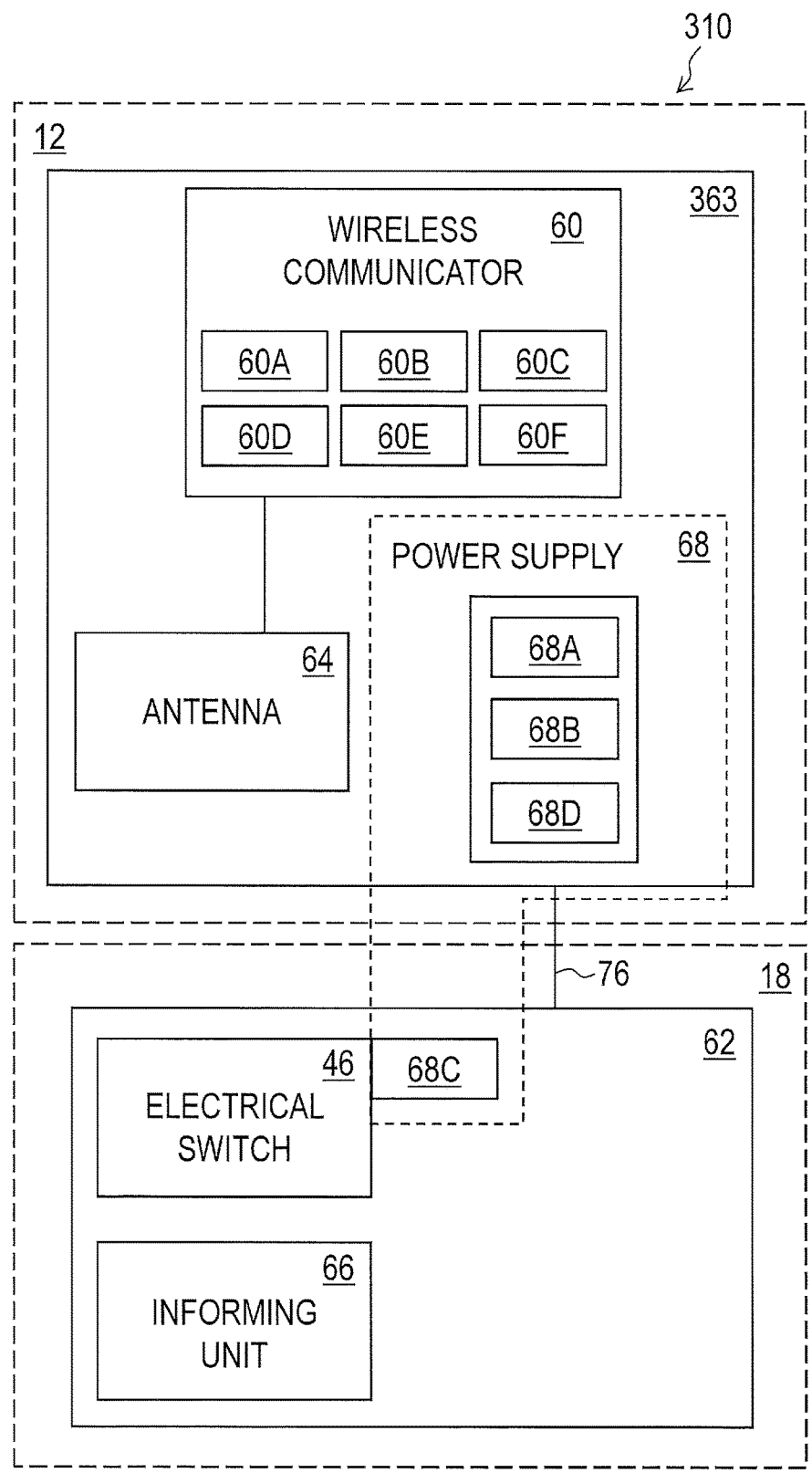
FIG. 16 is a schematic block diagram of the bicycle operating device illustrated in FIG. 14.

As seen in FIGS. 14 to 16, in the bicycle operating device 310 of the third embodiment, the wireless communicator 60 and the power supply 68 are disposed at the base member 12. As seen in FIG. 15, the wireless communicator 60 and the power supply 68 are provided in the accommodation space 70. The bicycle operating device 310 comprises an additional substrate 363 secured to the base member 12. The additional substrate 363 is electrically connected to the battery holder 68B. The wireless communicator 60 is mounted on the additional substrate 363 and is electrically connected to the battery holder 68B via the additional substrate 363. As seen in FIG. 16, the antenna 64 is mounted on the additional substrate 363 and is electrically connected to the wireless communicator 60 and the battery holder 68B via the additional substrate 363.

As seen in FIG. 14, the positional relationship among the first end 12A, the second end 12B, the first pivot axis A1, the first pivot shaft 20, the hydraulic unit 26, the wireless communicator 60, and the power supply 68 is substantially the same as that of the bicycle operating device 10 of the first embodiment.

In this embodiment, however, the wireless communicator 60 is entirely disposed closer to the first end 12A than the first pivot axis A1 (the first pivot shaft 20) when viewed from the first direction D2. In this embodiment, the wireless communicator 60 is partly disposed below the first pivot axis A1 (the first pivot shaft 20) when viewed from the first direction D2 in the mounting state (the reference state) of the bicycle operating device 10. Furthermore, the wireless communicator 60 is partly disposed closer to the free end 14A than the first pivot axis A1 (the first pivot shaft 20) when viewed from the first direction D2.

As seen in FIG. 15, the wireless communicator 60 is disposed between the first lateral surface 72 and the second lateral surface 74 in the first direction D2. The first lateral surface 72 is closer to the wireless communicator 60 than the second lateral surface 74 in the first direction D2.

Fourth Embodiment

A bicycle operating device 410 in accordance with a fourth embodiment will be described below referring to FIGS. 17 to 20. The bicycle operating device 410 has the same structure and/or configuration as those of the bicycle operating device 10 except for the arrangement of the wireless communicator 60 and the power supply 68. Thus, elements having substantially the same function as those in the above embodiments will be numbered the same here, and will not be described and/or illustrated again in detail here for the sake of brevity.

As seen in FIGS. 17 to 20, in the bicycle operating device 410 of the fourth embodiment, the wireless communicator 60 is disposed at the base member 12 as well as the bicycle operating device 310 of the third embodiment. The power supply 68 is disposed at the additional operating member 18 as well as the bicycle operating device 210 of the second embodiment. In this embodiment, the wireless communicator 60 is provided in the accommodation space 70. The power supply 68 is provided outside the accommodation space 70.

Figure 17:
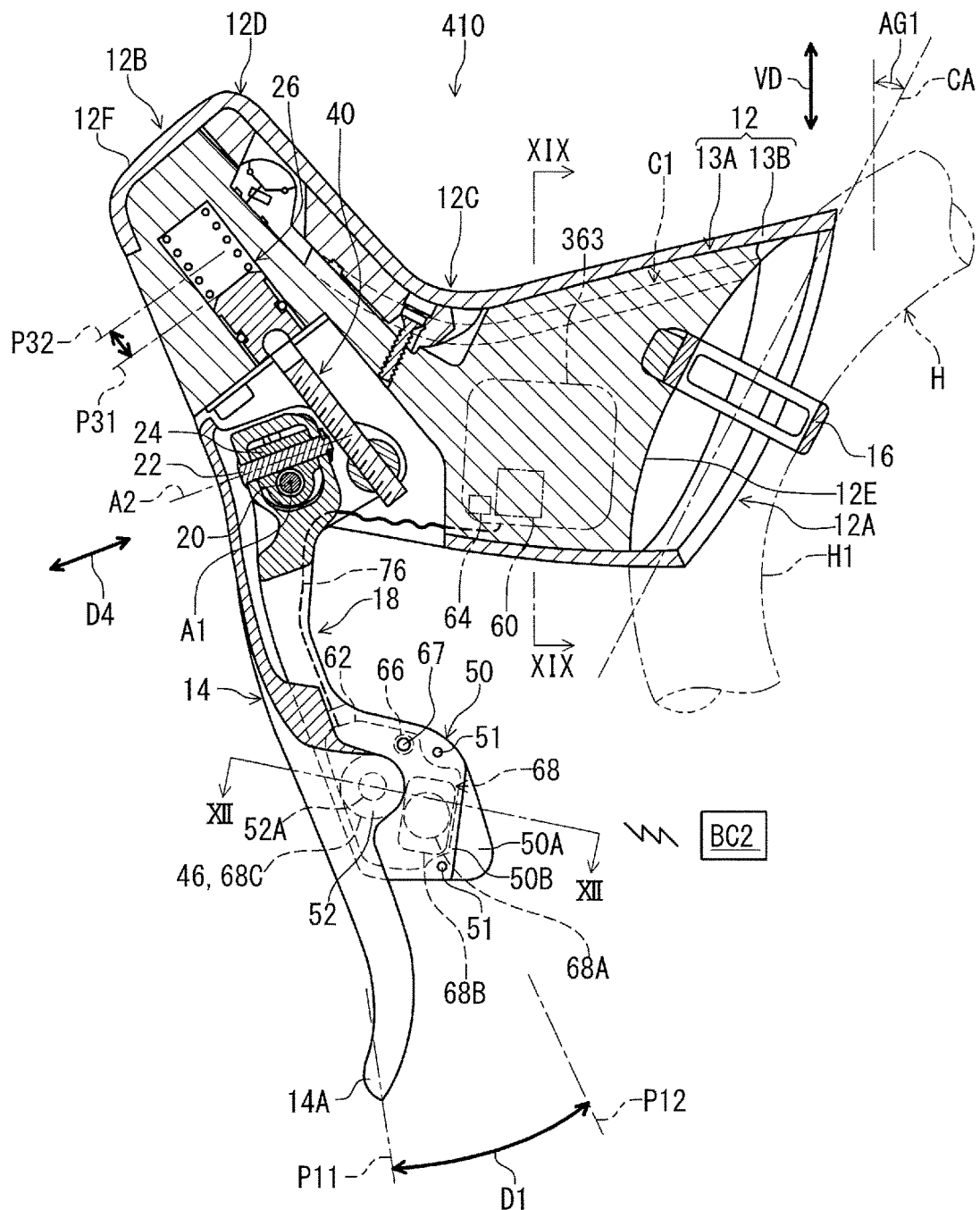
FIG. 17 is a cross-sectional view of a bicycle operating device in accordance with a fourth embodiment.
Figure 18:
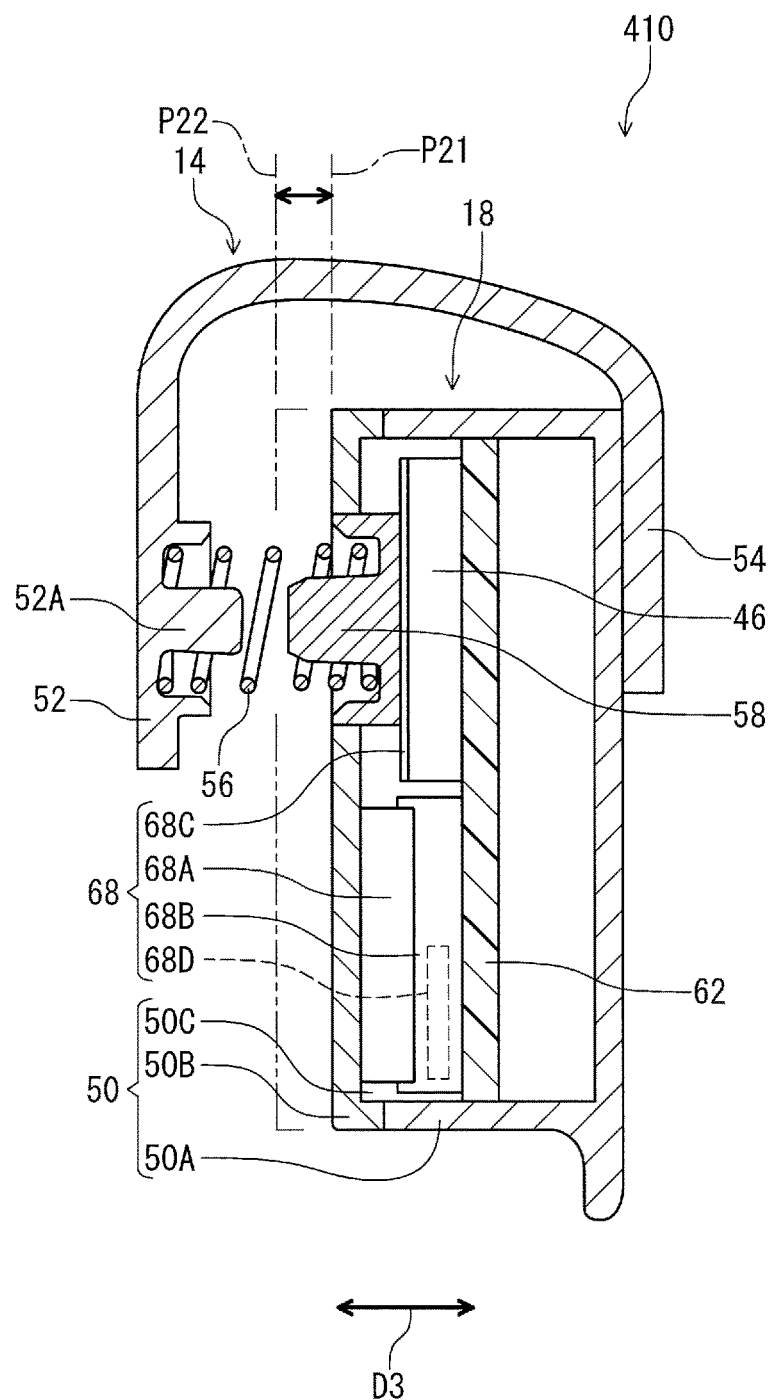
FIG. 18 is a cross-sectional view of the bicycle operating device taken along line XVIII-XVIII of FIG. 17.

As seen in FIG. 17, the positional relationship among the first end 12A, the second end 12B, the first pivot axis A1, the first pivot shaft 20, the hydraulic unit 26, the wireless communicator 60, and the power supply 68 is substantially the same as that of the bicycle operating device 10 of the first embodiment.

In this embodiment, however, the wireless communicator 60 is entirely disposed closer to the first end 12A than the first pivot axis A1 (the first pivot shaft 20) when viewed from the first direction D2. The power supply 68 is partly disposed closer to the first end 12A than the first pivot axis A1 (the first pivot shaft 20) when viewed from the first direction D2. The wireless communicator 60 is partly disposed below the first pivot axis A1 (the first pivot shaft 20) when viewed from the first direction D2 in the mounting state (the reference state) of the bicycle operating device 10. The power supply 68 is entirely disposed below the first pivot axis A1 (the first pivot shaft 20) when viewed from the first direction D2 in the mounting state (the reference state) of the bicycle operating device 10.

Figure 19:
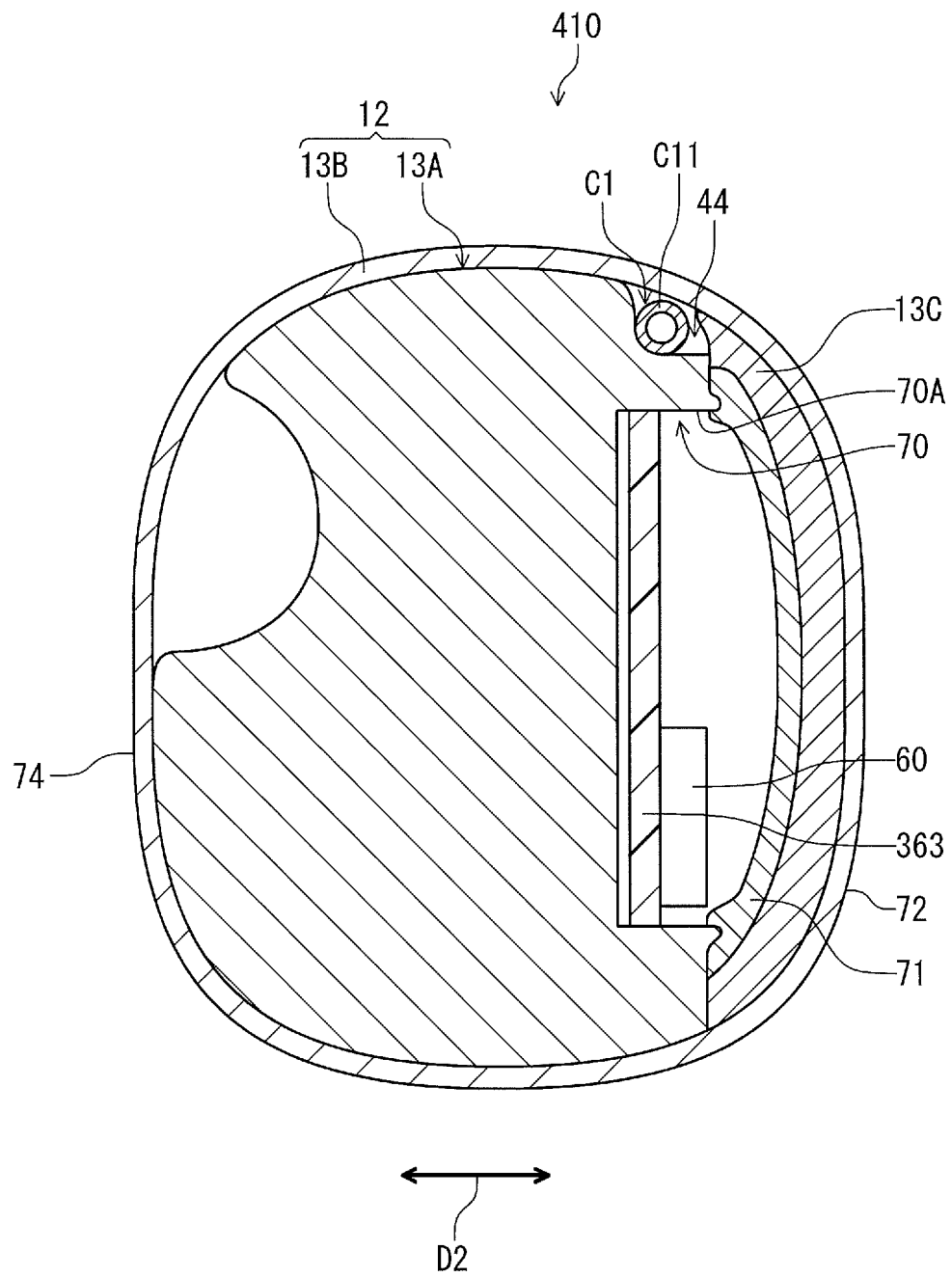
FIG. 19 is a cross-sectional view of the bicycle operating device taken along line XIX-XIX of FIG. 17.
Figure 20:
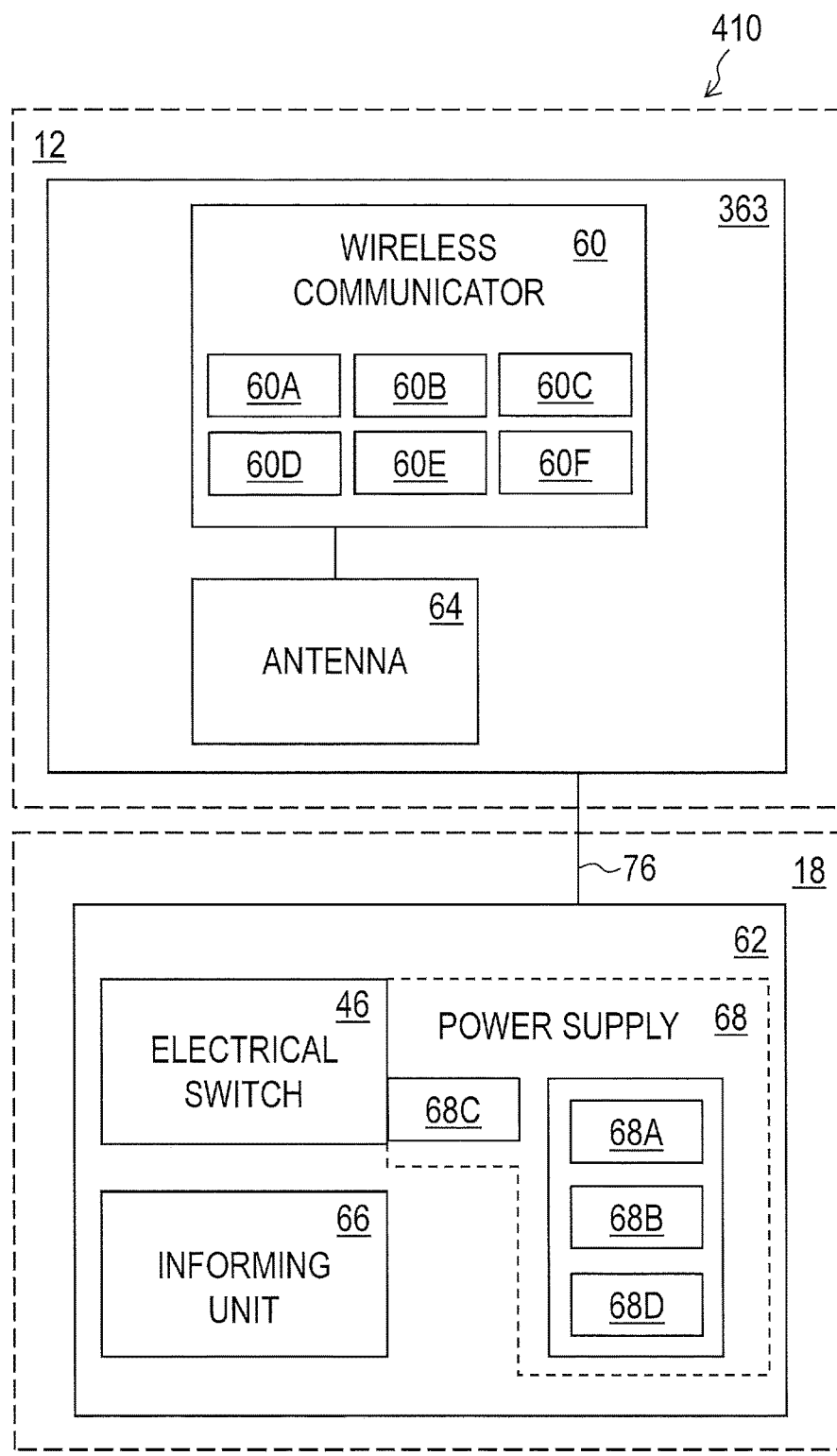
FIG. 20 is a schematic block diagram of the bicycle operating device illustrated in FIG. 14.

As seen in FIG. 19, the wireless communicator 60 is disposed between the first lateral surface 72 and the second lateral surface 74 in the first direction D2. The first lateral surface 72 is closer to the wireless communicator 60 than the second lateral surface 74 in the first direction D2.

Fifth Embodiment

A bicycle operating device 510 in accordance with a fifth embodiment will be described below referring to FIGS. 21 to 23. The bicycle operating device 510 has the same structure and/or configuration as those of the bicycle operating device 10 except for the power supply 68. Thus, elements having substantially the same function as those in the above embodiments will be numbered the same here, and will not be described and/or illustrated again in detail here for the sake of brevity.

Figure 21:
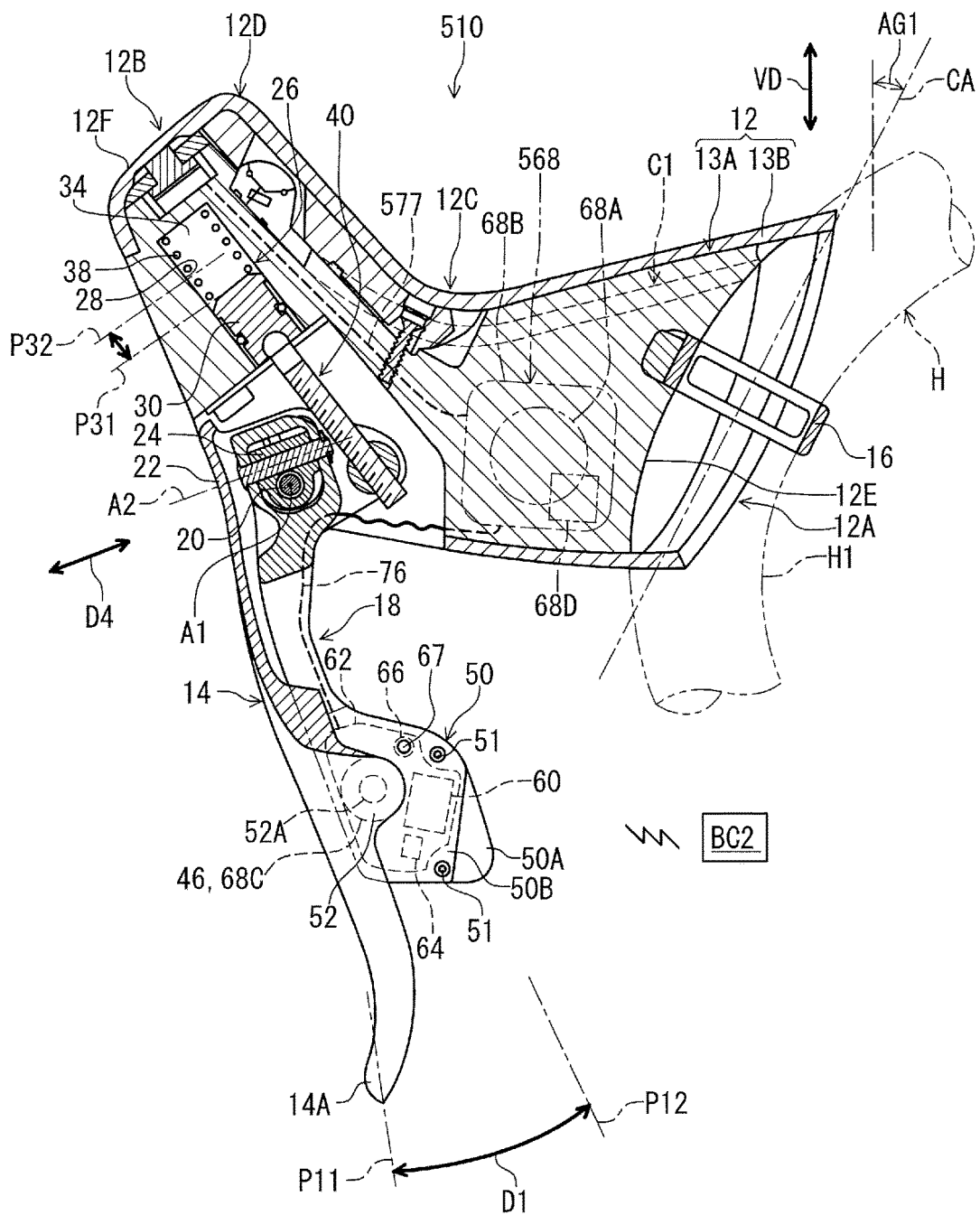
FIG. 21 is a cross-sectional view of a bicycle operating device in accordance with a fifth embodiment.
Figure 22:
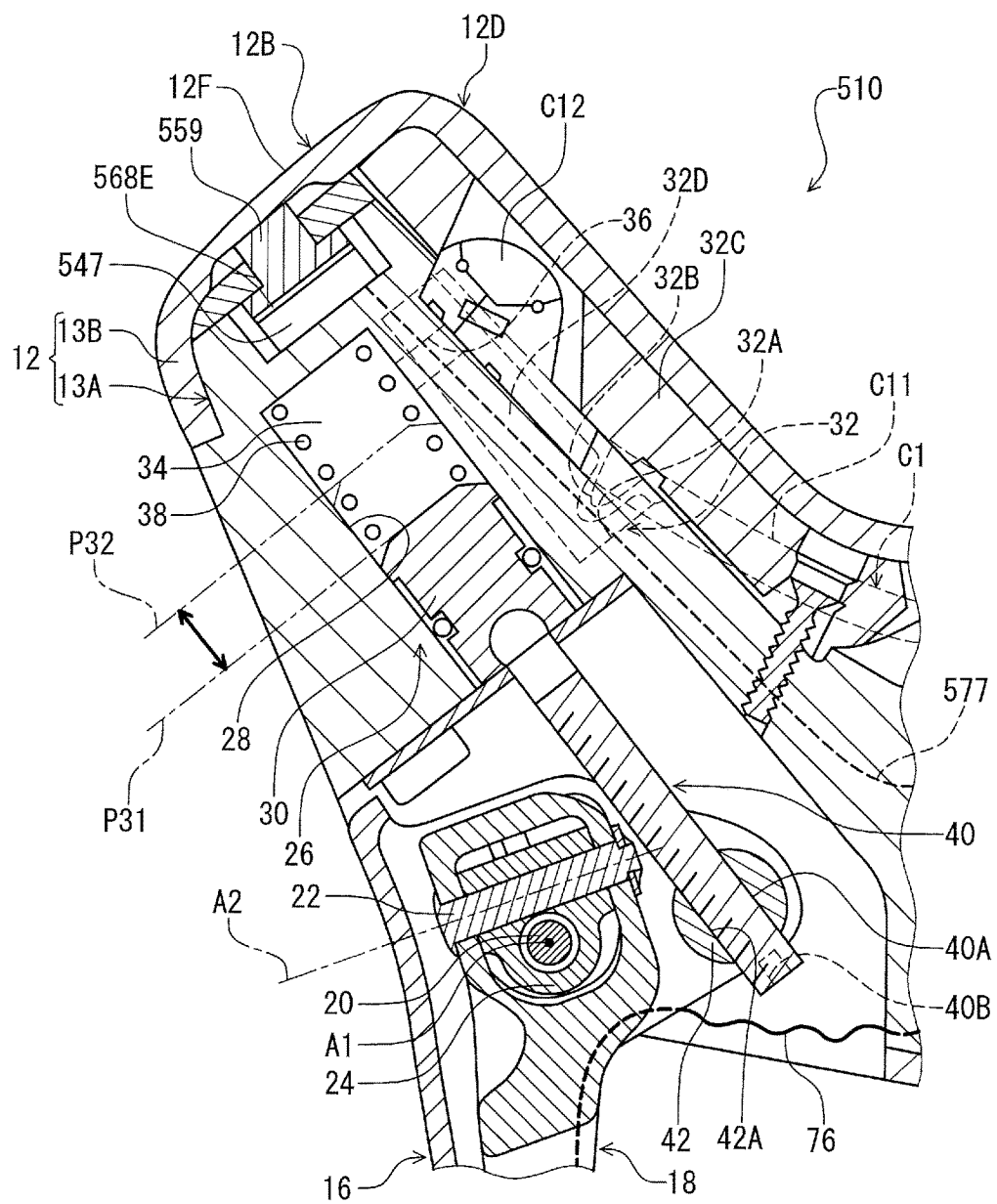
FIG. 22 is a partial cross-sectional view of the bicycle operating device illustrated in FIG. 21.
Figure 23:
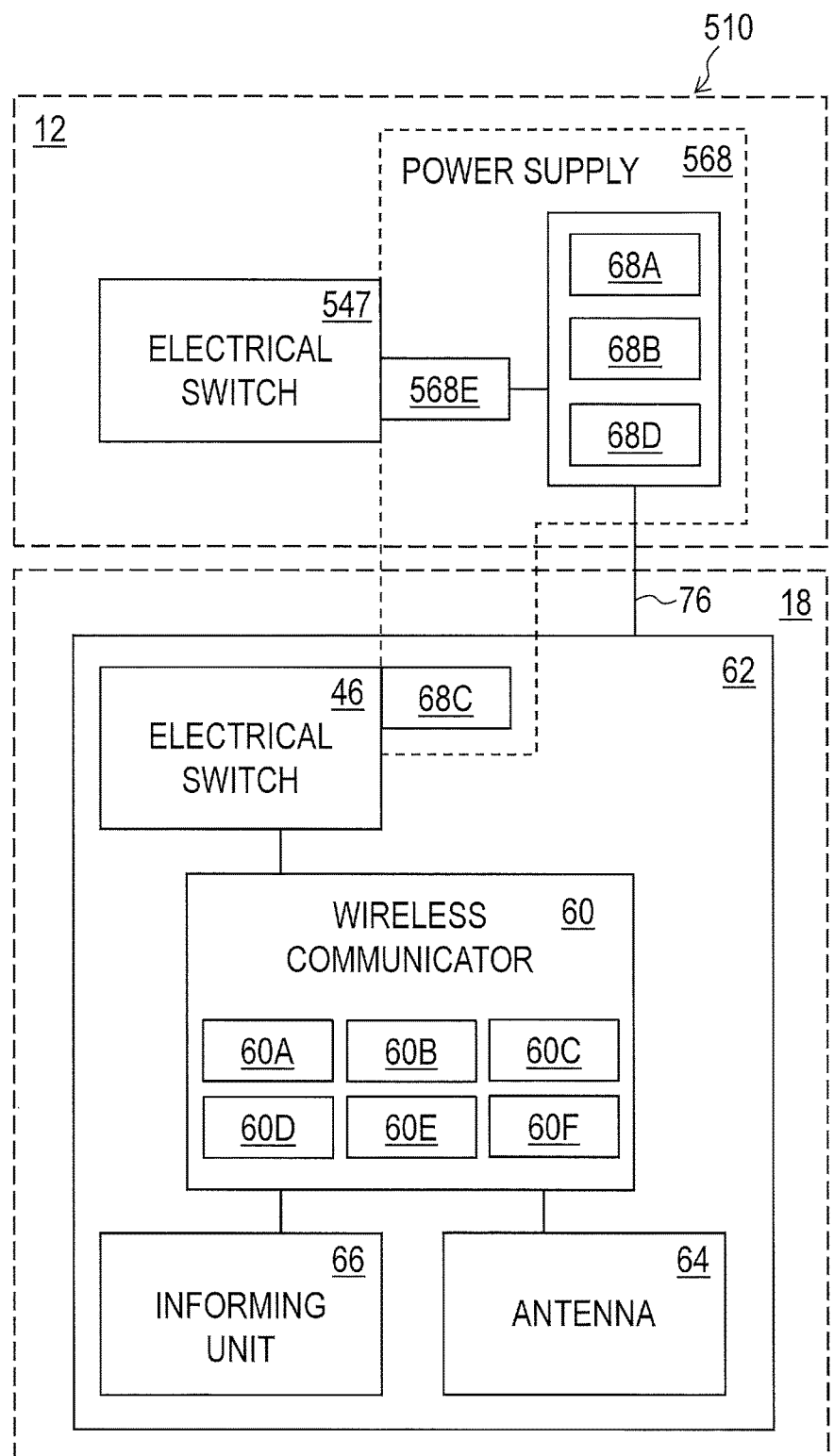
FIG. 23 is a schematic block diagram of the bicycle operating device illustrated in FIG. 21.

As seen in FIGS. 21 to 23, the bicycle operating device 510 comprises a power supply 568. The power supply 568 has substantially the same structure as that of the power supply 68 of the first embodiment. However, the power supply 568 further includes an additional electric-energy generation element 568E in addition to the battery 68A, the battery holder 68B, the electric-energy generation element 68C, and the rectifying circuit 68D. The additional electric-energy generation element 568E has substantially the same structure as that of the electric-energy generation element 68C.

As seen in FIG. 22, the bicycle operating device 510 further comprises an additional electrical switch 547 and a button element 559 in addition to the electrical switch 46 and the button element 559. The additional electrical switch 547 has substantially the same structure as that of the electrical switch 46. However, the additional electrical switch 547 is disposed at the base member 12. In this embodiment, the additional electrical switch 547 is disposed at the second end 12B of the base member 12. The additional electric-energy generation element 568E is provided between the electrical switch 46 and the button element 559. The additional electrical switch 547 and the additional electric-energy generation element 568E are electrically connected to the battery holder 68B via an additional cable 577. The additional electrical switch 547 and the additional electric-energy generation element 568E are electrically connected to the wireless communicator 60 via the additional cable 577, the battery holder 68B, the cable 76, and the substrate 62.

The wireless communicator 60 is electrically connected to the additional electrical switch 547 to wirelessly transmit a signal to the additional component BC2 in response to the input operation. The additional electrical switch 547 can have the same function (e.g., an upshift switch or a downshift switch) as that of the electrical switch 46. At least one of the electrical switch 46 and the additional electrical switch 547 can be omitted from the bicycle operating device 510. Another electrical switch can be disposed at a position other than the bicycle operating device 510 instead of or in addition to the electrical switch 46 and the additional electrical switch 547.

As seen in FIG. 21, the positional relationship among the first end 12A, the second end 12B, the first pivot axis A1, the first pivot shaft 20, the hydraulic unit 26, the wireless communicator 60, and the power supply 68 is substantially the same as that of the bicycle operating device 10 of the first embodiment.

The above structures of the bicycle operating device 510 of the fifth embodiment can be applied to each of the first to fourth embodiments.

Sixth Embodiment

A bicycle operating device 610 in accordance with a sixth embodiment will be described below referring to FIGS. 24 and 25. The bicycle operating device 610 has the same structure and/or configuration as those of the bicycle operating device 10 except for the arrangement of the wireless communicator 60. Thus, elements having substantially the same function as those in the above embodiments will be numbered the same here, and will not be described and/or illustrated again in detail here for the sake of brevity.

Figure 24:
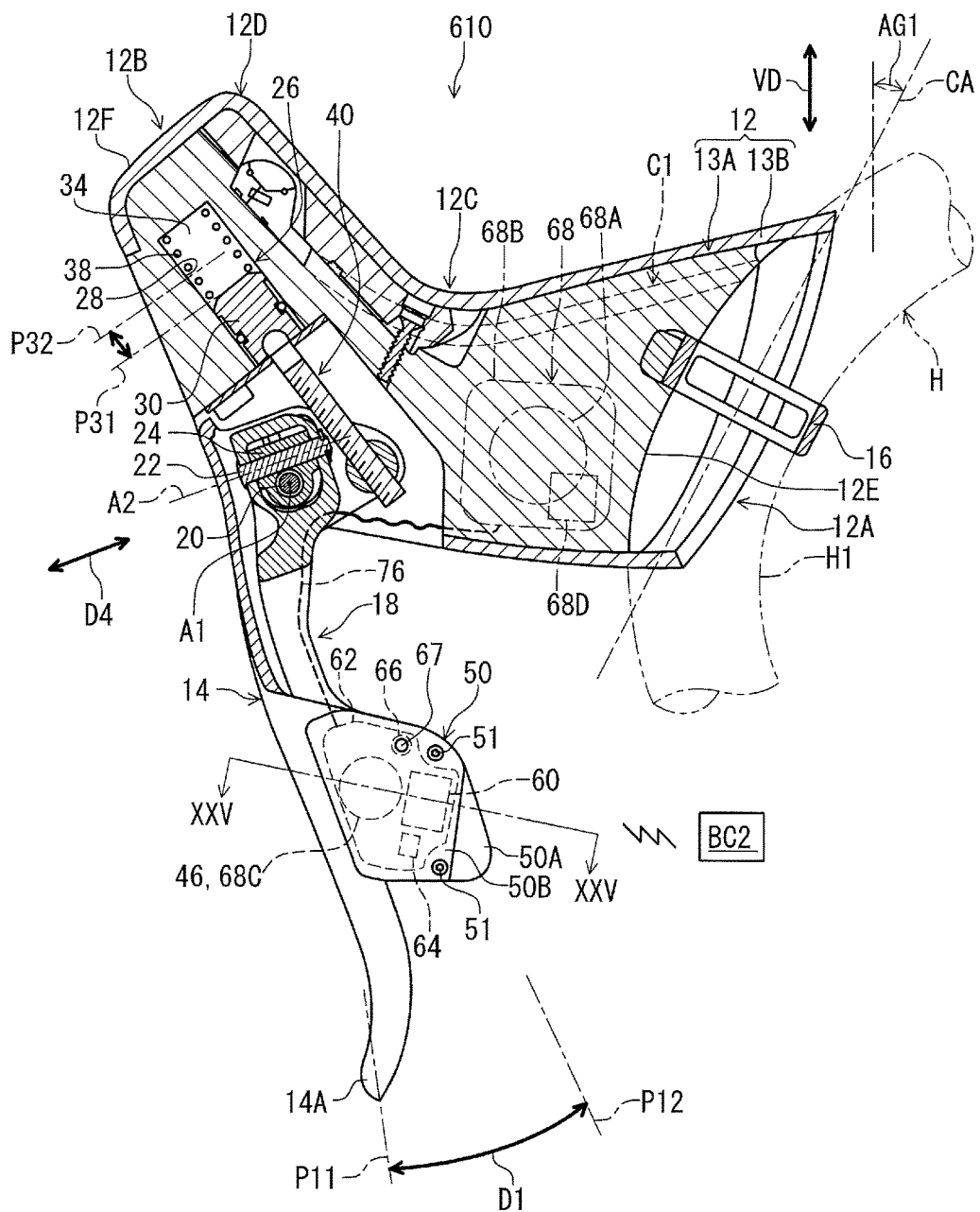
FIG. 24 is a cross-sectional view of a bicycle operating device in accordance with a sixth embodiment.
Figure 25:
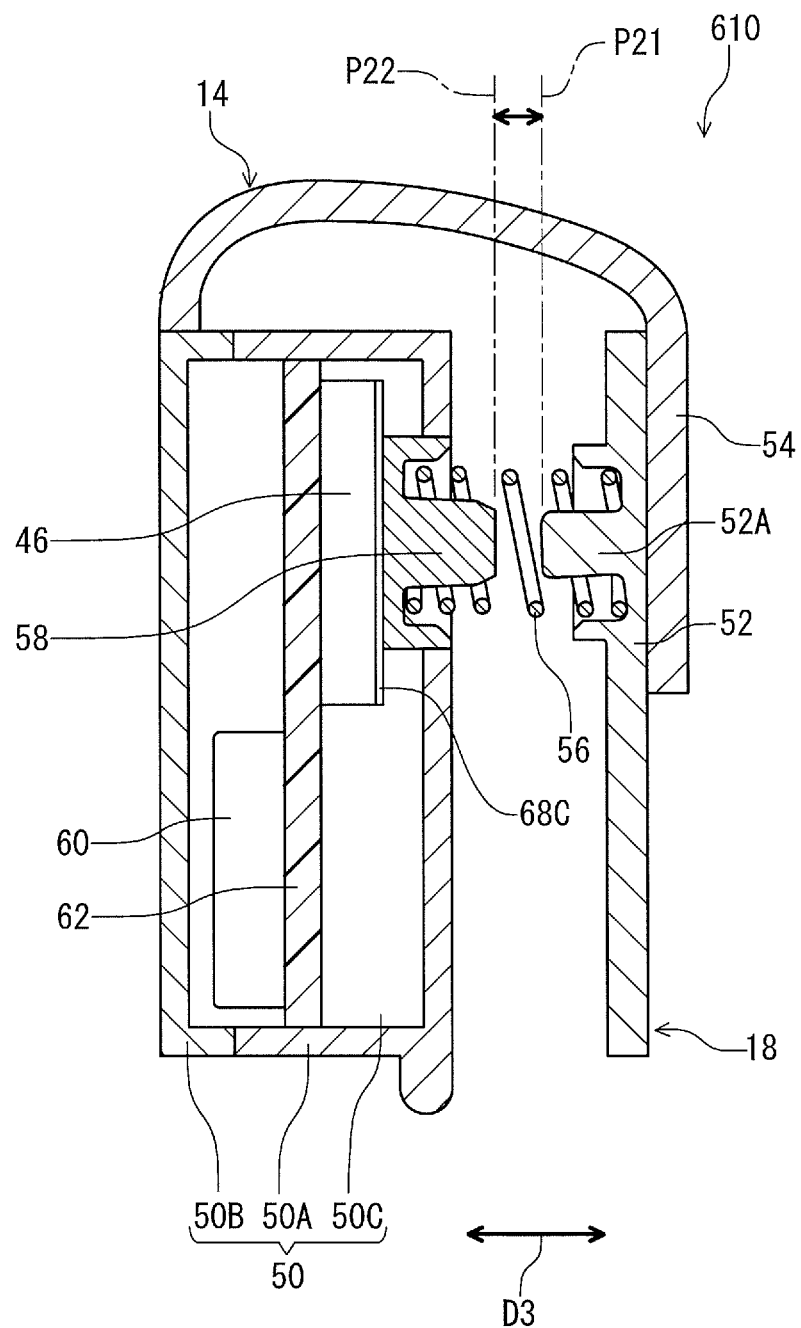
FIG. 25 is a cross-sectional view of the bicycle operating device taken along line XXV-XXV of FIG. 24.

As seen in FIGS. 24 and 25, in the bicycle operating device 610 of the sixth embodiment, the wireless communicator 60 is disposed at the operating member 14. As seen in FIG. 25, the operating member 14 includes the attachment part 50. The additional operating member 18 includes the actuation part 52. The additional operating member 18 can be omitted from the bicycle operating device 610 in a case where a push button switch including the electrical switch 46 is attached to the operating member 14. The power supply 68 can be at least partly disposed at the operating member 14 instead of or in addition to the wireless communicator 60.

The above structures of the bicycle operating device 610 of the sixth embodiment can be applied to each of the first to fifth embodiments.

In the first to sixth embodiments, at least one of the wireless communicator 60 and the power supply 68 can be partly provided around the hydraulic unit 26.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
  a base member including
    a first end to be mounted to a bicycle handlebar, and
    a second end opposite to the first end;
  an operating member pivotally coupled to the base member about a first pivot axis;
  a hydraulic unit coupled to the operating member to operate a bicycle component in response to an operation of the operating member, at least part of the hydraulic unit being disposed closer to the second end than the first pivot axis when viewed from a first direction parallel to the first pivot axis;
  an electrical switch to be activated by an input operation from a user;
  a wireless communicator electrically connected to the electrical switch to wirelessly transmit a signal via an antenna to an additional component in response to the input operation; and
  a power supply electrically connected to the wireless communicator to supply electrical power to the wireless communicator, at least one of the wireless communicator and the power supply being at least partly disposed closer to the first end than the first pivot axis when viewed from the first direction, wherein
    the power supply is disposed below the first pivot axis when viewed from the first direction, and/or the antenna is disposed above the electrical switch when viewed from the first direction.

2. The bicycle operating device according to claim 1, further comprising:
a first pivot shaft pivotally coupling the operating member to the base member about the first pivot axis, wherein
the at least part of the hydraulic unit is disposed closer to the second end than the first pivot shaft, and
the at least one of the wireless communicator and the power supply is at least partly disposed closer to the first end than the first pivot shaft.

3. The bicycle operating device according to claim 1, wherein
the hydraulic unit includes
a cylinder bore,
a piston movably provided in the cylinder bore, and
a hydraulic reservoir connected to the cylinder bore, and
at least one of the cylinder bore, the piston, and the hydraulic reservoir is at least partly disposed closer to the second end than the first pivot axis when viewed from the first direction.

4. A bicycle operating device comprising:
a base member including
a first end to be mounted to a bicycle handlebar, and
a second end opposite to the first end;
an operating member pivotally coupled to the base member about a first pivot axis;
a hydraulic unit coupled to the operating member to operate a bicycle component in response to an operation of the operating member, at least part of the hydraulic unit being disposed above the first pivot axis when viewed from a first direction parallel to the first pivot axis in a mounting state where the bicycle operating device is mounted to the bicycle handlebar;
an electrical switch to be activated by an input operation from a user;
a wireless communicator electrically connected to the electrical switch to wirelessly transmit a signal via an antenna to an additional component in response to the input operation; and
a power supply electrically connected to the wireless communicator to supply electrical power to the wireless communicator, the power supply being disposed below the first pivot axis when viewed from the first direction in the mounting state of the bicycle operating device and/or the antenna is disposed above the electrical switch when viewed from the first direction in the mounting state of the bicycle operating device.

5. The bicycle operating device according to claim 4, further comprising:
a mounting clamp to be coupled to the bicycle handlebar, the mounting clamp having an annular shape, the annular shape having a clamp center axis, wherein
the operating member has a free end farthest from the first pivot axis in the operating member when viewed from the first direction,
the at least part of the hydraulic unit is disposed above the first pivot axis when viewed from the first direction in a reference state where the clamp center axis is disposed along a vertical direction and where the free end is disposed below the mounting clamp, and
the at least one of the wireless communicator and the power supply is at least partly disposed below the first pivot axis when viewed from the first direction in the reference state of the bicycle operating device.

6. The bicycle operating device according to claim 4, further comprising:
a first pivot shaft pivotally coupling the operating member to the base member about the first pivot axis, wherein
the at least part of the hydraulic unit is disposed above the first pivot shaft when viewed from the first direction in the mounting state of the bicycle operating device, and
the at least one of the wireless communicator and the power supply is at least partly disposed below the first pivot shaft when viewed from the first direction in the mounting state of the bicycle operating device.

7. The bicycle operating device according to claim 4, wherein
the hydraulic unit includes
a cylinder bore,
a piston movably provided in the cylinder bore, and
a hydraulic reservoir connected to the cylinder bore, and
at least one of the cylinder bore, the piston, and the hydraulic reservoir is at least partly disposed above the first pivot axis when viewed from the first direction in the mounting state of the bicycle operating device.

8. A bicycle operating device comprising:
a base member including
a first end to be mounted to a bicycle handlebar, and
a second end opposite to the first end;
an operating member pivotally coupled to the base member about a first pivot axis, the operating member having a free end farthest from the first pivot axis in the operating member when viewed from a first direction parallel to the first pivot axis;
a hydraulic unit coupled to the operating member to operate a bicycle component in response to an operation of the operating member, at least part of the hydraulic unit being disposed farther from the free end than the first pivot axis when viewed from the first direction;
an electrical switch to be activated by an input operation from a user;
a wireless communicator electrically connected to the electrical switch to wirelessly transmit a signal to an additional component in response to the input operation; and
a power supply electrically connected to the wireless communicator to supply electrical power to the wireless communicator, an entirety of the power supply being disposed closer to the free end than the first pivot axis when viewed from the first direction.

9. The bicycle operating device according to claim 8, further comprising:
a first pivot shaft pivotally coupling the operating member to the base member about the first pivot axis, wherein
the at least part of the hydraulic unit is disposed farther from the free end than the first pivot shaft when viewed from the first direction, and
the at least one of the wireless communicator and the power supply is at least partly disposed closer to the free end than the first pivot shaft when viewed from the first direction.

10. The bicycle operating device according to claim 8, wherein
the hydraulic unit includes
a cylinder bore,
a piston movably provided in the cylinder bore, and
a hydraulic reservoir connected to the cylinder bore, and at least one of the cylinder bore, the piston, and the hydraulic reservoir is at least partly disposed farther from the free end than the first pivot axis when viewed from the first direction.

11. A bicycle operating device comprising:
a base member including
a first end to be mounted to a bicycle handlebar, and
a second end opposite to the first end;
an operating member pivotally coupled to the base member about a first pivot axis;
a hydraulic unit coupled to the operating member to operate a bicycle component in response to an operation of the operating member;
an electrical switch to be activated by an input operation from a user;
a wireless communicator electrically connected to the electrical switch to wirelessly transmit a signal via an antenna to an additional component in response to the input operation; and
a power supply electrically connected to the wireless communicator to supply electrical power to the wireless communicator, the hydraulic unit being at least partly disposed closer to the second end than at least one of the wireless communicator and the power supply when viewed from a first direction parallel to the first pivot axis, wherein
the power supply is disposed below the first pivot axis when viewed from the first direction, and/or
the antenna is disposed above the electrical switch when viewed from the first direction.

12. The bicycle operating device according to claim 11, wherein
the hydraulic unit includes
a cylinder bore,
a piston movably provided in the cylinder bore, and
a hydraulic reservoir connected to the cylinder bore, and
at least one of the cylinder bore, the piston, and the hydraulic reservoir is at least partly disposed closer to the second end than the at least one of the wireless communicator and the power supply when viewed from the first direction.

13. The bicycle operating device according to claim 1, wherein
the hydraulic unit is at least partly disposed in the base member.

14. The bicycle operating device according to claim 1, wherein
the hydraulic unit includes
a cylinder bore, and
a piston movably provided in the cylinder bore, and
the base member includes a hose passageway in which a hydraulic hose connected to the hydraulic unit is provided.

15. The bicycle operating device according to claim 14, wherein
the base member includes a base body and a hose cover attached to the base member to at least partly provide the hose passageway between the base body and the hose cover, the hose cover being a separate member from the base member,
the base body includes an accommodation space in which the wireless communicator is at least partly provided, the accommodation space including an outer opening, and
the hose cover is attached to the base body to at least partly cover the outer opening of the accommodation space.

16. The bicycle operating device according to claim 15, wherein
the hose cover is integrally provided as a one-piece unitary member.

17. The bicycle operating device according to claim 14, wherein
the at least one of the wireless communicator and the power supply is at least partly disposed below the hose passageway when viewed from the first direction in a mounting state where the bicycle operating device is mounted to the bicycle handlebar.

18. The bicycle operating device according to claim 1, wherein
the wireless communicator is at least partly disposed at the base member.

19. The bicycle operating device according to claim 1, wherein
the bicycle operating device is configured to be mounted on a bicycle having a transverse center plane,
the base member includes a first lateral surface and a second lateral surface,
the wireless communicator is disposed between the first lateral surface and the second lateral surface in the first direction, and
the first lateral surface is closer to the wireless communicator than the second lateral surface in the first direction.

20. The bicycle operating device according to claim 19, wherein
the first lateral surface is disposed closer to the transverse center plane than the second lateral surface.

21. The bicycle operating device according to claim 1, wherein
the power supply is at least partly disposed at the operating member.

22. The bicycle operating device according to claim 1, further comprising:
an additional operating member movably coupled to the operating member, wherein
power supply is at least partly disposed at the additional operating member.

23. The bicycle operating device according to claim 22, wherein
the wireless communicator is at least partly disposed at the additional operating member.

24. The bicycle operating device according to claim 23, further comprising:
a cable electrically connecting between the wireless communicator and the power supply.

25. The bicycle operating device according to claim 1, wherein
the power supply includes a battery and a battery holder, the battery being detachably mounted to the battery holder.

26. The bicycle operating device according to claim 1, wherein
the base member includes a mounting surface disposed at the first end, and
the mounting surface includes a curved shape corresponding to a drop-down handlebar.

27. The bicycle operating device according to claim 1, wherein
the base member includes a grip portion arranged between the first end and the second end.

28. The bicycle operating device according to claim 1, wherein
the base member includes a pommel portion disposed at the second end.

29. The bicycle operating device according to claim 1, wherein
the power supply is disposed entirely below the first pivot axis when viewed from the first direction.

30. The bicycle operating device according to claim 4, wherein
the power supply is disposed entirely below the first pivot axis when viewed from the first direction in the mounting state of the bicycle operating device.

31. The bicycle operating device according to claim 11, wherein
the power supply is disposed entirely below the first pivot axis when viewed from the first direction.

32. A bicycle operating device comprising:
a base member including
a first end to be mounted to a bicycle handlebar, and
a second end opposite to the first end;
an operating member pivotally coupled to the base member about a first pivot axis;
a hydraulic unit coupled to the operating member to operate a bicycle component in response to an operation of the operating member;
an electrical switch to be activated by an input operation from a user;
a wireless communicator electrically connected to the electrical switch to wirelessly transmit a signal via an antenna to an additional component in response to the input operation; and
a power supply electrically connected to the wireless communicator to supply electrical power to the wireless communicator, wherein
the antenna is disposed above the electrical switch when viewed from a first direction parallel to the first pivot axis.

33. The bicycle operating device according to claim 32, wherein
the wireless communicator and the power supply partially overlap when viewed from the first direction.

34. The bicycle operating device according to claim 32, further comprising:
a cover covering a space housing the power supply.

35. The bicycle operating device according to claim 32, wherein
one of the power supply and wireless communicator is arranged near to the second end.

* * * * *